(12) United States Patent
Moore et al.

(10) Patent No.: US 7,707,496 B1
(45) Date of Patent: Apr. 27, 2010

(54) METHOD, SYSTEM, AND APPARATUS FOR CONVERTING DATES BETWEEN CALENDARS AND LANGUAGES BASED UPON SEMANTICALLY LABELED STRINGS

(75) Inventors: Thomas G. Moore, Duvall, WA (US); Mohamed A. Abbar, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 687 days.

(21) Appl. No.: 10/141,712

(22) Filed: May 9, 2002

(51) Int. Cl.
*G06N 3/00* (2006.01)

(52) U.S. Cl. .................................. 715/254

(58) Field of Classification Search ............ 368/10, 368/9; 715/762, 866, 513, 517, 523, 530, 715/234, 243, 254, 255; 705/8
See application file for complete search history.

(56) References Cited

U.S. PATENT DOCUMENTS

| | | | |
|---|---|---|---|
| 4,674,065 A | 6/1987 | Lange et al. ............. 364/900 |
| 4,868,750 A | 9/1989 | Kucera et al. ............ 704/8 |
| 5,020,019 A | 5/1991 | Ogawa .................... 364/900 |
| 5,128,865 A | 7/1992 | Sadler .................... 704/2 |
| 5,159,552 A | 10/1992 | van Gasteren et al. ...... 704/1 |
| 5,267,155 A | 11/1993 | Buchanan et al. ........ 364/419.14 |
| 5,287,448 A | 2/1994 | Nicol et al. ............. 715/707 |
| 5,297,039 A | 3/1994 | Kanaegami et al. ......... 707/5 |
| 5,317,546 A * | 5/1994 | Balch et al. .............. 368/9 |
| 5,337,233 A | 8/1994 | Hofert et al. ............ 364/419.14 |
| 5,341,293 A | 8/1994 | Vertelney et al. .......... 715/530 |
| 5,351,190 A | 9/1994 | Kondo .................... 364/419.08 |
| 5,386,564 A | 1/1995 | Shearer et al. ............ 395/650 |
| 5,392,386 A | 2/1995 | Chalas ................... 395/155 |
| 5,418,902 A | 5/1995 | West et al. ............... 715/503 |
| 5,446,891 A | 8/1995 | Kaplan et al. ............. 707/2 |
| 5,522,089 A | 5/1996 | Kikinis et al. ............ 710/73 |
| 5,535,323 A | 7/1996 | Miller et al. ............. 715/707 |

(Continued)

FOREIGN PATENT DOCUMENTS

CA 2 246 920 A1 3/2000

(Continued)

OTHER PUBLICATIONS

IBM Technical Disclosure Bulletin, Nov. 1, 1993, vol. 36, Issue 11, pp. 629-638.*

(Continued)

*Primary Examiner*—Kyle R Stork
(74) *Attorney, Agent, or Firm*—Merchant & Gould

(57) ABSTRACT

A method, system, and apparatus are provided for converting dates between calendars and languages. When a string of text is entered into an application program, the string is analyzed to determine whether the string of text includes a date. If the string of text includes a date, the date is semantically labeled with schema information that identifies the calendar and language used to express the date. When a selection is received of the date or an indication that the date is labeled with schema information, a list of actions may be provided identifying conversion options available for the date. One of the conversion options may then be selected resulting in the conversion of the selected date to the calendar and language identified by the selected action. The converted date may then be inserted into the string of text to replace the selected date.

13 Claims, 14 Drawing Sheets

U.S. PATENT DOCUMENTS

| | | | |
|---|---|---|---|
| 5,541,836 A | 7/1996 | Church et al. | 704/7 |
| 5,546,521 A | 8/1996 | Martinez | 715/711 |
| 5,581,684 A | 12/1996 | Dudzik et al. | 715/708 |
| 5,596,700 A | 1/1997 | Darnell et al. | 715/512 |
| 5,617,565 A | 4/1997 | Augenbraun et al. | 707/4 |
| 5,625,783 A | 4/1997 | Ezekiel et al. | 719/320 |
| 5,627,567 A | 5/1997 | Davidson | 345/173 |
| 5,627,958 A | 5/1997 | Potts et al. | 715/708 |
| 5,634,019 A | 5/1997 | Koppolu et al. | 715/744 |
| 5,640,560 A | 6/1997 | Smith | 707/104.1 |
| 5,657,259 A | 8/1997 | Davis et al. | 364/715.03 |
| 5,685,000 A | 11/1997 | Cox | 704/9 |
| 5,708,825 A | 1/1998 | Sotomayor | 715/501.1 |
| 5,715,415 A | 2/1998 | Dazey et al. | 715/708 |
| 5,717,923 A | 2/1998 | Dedrick | 707/102 |
| 5,752,022 A | 5/1998 | Chiu et al. | 707/10 |
| 5,761,689 A | 6/1998 | Rayson et al. | 707/533 |
| 5,764,794 A | 6/1998 | Perlin | 382/186 |
| 5,765,156 A | 6/1998 | Guzak et al. | 707/100 |
| 5,781,189 A | 7/1998 | Holleran et al. | 715/826 |
| 5,781,904 A | 7/1998 | Oren et al. | 707/100 |
| 5,794,257 A | 8/1998 | Liu et al. | 715/501.1 |
| 5,799,068 A | 8/1998 | Kikinis et al. | 379/93.06 |
| 5,802,253 A | 9/1998 | Gross et al. | 706/47 |
| 5,802,262 A | 9/1998 | Van De Vanter | 714/1 |
| 5,802,299 A | 9/1998 | Logan et al. | 709/218 |
| 5,802,530 A | 9/1998 | van Hoff | 715/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | van Hoff | 709/236 |
| 5,822,720 A | 10/1998 | Bookman et al. | 704/3 |
| 5,826,025 A | 10/1998 | Gramlich | 709/217 |
| 5,832,100 A | 11/1998 | Lawton et al. | 382/100 |
| 5,845,077 A | 12/1998 | Fawcett | 709/221 |
| 5,855,007 A | 12/1998 | Jovicic et al. | 705/14 |
| 5,859,636 A | 1/1999 | Pandit | 345/335 |
| 5,872,973 A | 2/1999 | Mitchell et al. | 719/332 |
| 5,875,443 A | 2/1999 | Nielsen | 707/2 |
| 5,877,757 A | 3/1999 | Baldwin et al. | 715/705 |
| 5,884,266 A | 3/1999 | Dvorak | 704/270.1 |
| 5,892,919 A | 4/1999 | Nielsen | 395/200.58 |
| 5,893,073 A * | 4/1999 | Kasso et al. | 705/8 |
| 5,893,132 A | 4/1999 | Huffman et al. | 715/201 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | 707/530 |
| 5,907,852 A | 5/1999 | Yamada | 715/541 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,139 A | 8/1999 | Feigner et al. | 715/708 |
| 5,933,140 A | 8/1999 | Strahorn et al. | 715/712 |
| 5,933,498 A | 8/1999 | Schneck et al. | 705/54 |
| 5,940,614 A | 8/1999 | Allen et al. | 717/120 |
| 5,944,787 A | 8/1999 | Zoken | 709/206 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A | 10/1999 | Beauregard et al. | 707/6 |
| 5,987,480 A | 11/1999 | Donohue et al. | 715/501.1 |
| 5,991,719 A | 11/1999 | Yazaki et al. | 704/251 |
| 5,995,756 A | 11/1999 | Hermann | 717/178 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,018,761 A | 1/2000 | Uomini | 706/206 |
| 6,028,605 A | 2/2000 | Conrad et al. | 345/354 |
| 6,029,135 A | 2/2000 | Krasle | 704/275 |
| 6,029,171 A | 2/2000 | Smiga et al. | 707/102 |
| 6,031,525 A | 2/2000 | Perlin | 345/173 |
| 6,052,531 A | 4/2000 | Waldin et al. | 717/170 |
| 6,061,516 A | 5/2000 | Yoshikawa et al. | 717/109 |
| 6,067,087 A * | 5/2000 | Krauss et al. | 715/762 |
| 6,072,475 A | 6/2000 | Van Ketwich | 345/173 |
| 6,073,090 A * | 6/2000 | Fortune et al. | 704/8 |
| 6,085,201 A | 7/2000 | Tso | 707/505 |
| 6,088,711 A | 7/2000 | Fein et al. | 715/523 |
| 6,092,074 A | 7/2000 | Rodkin et al. | 707/102 |
| 6,108,640 A * | 8/2000 | Slotznick | 705/26 |
| 6,108,674 A | 8/2000 | Murakami et al. | 707/515 |
| 6,112,209 A | 8/2000 | Gusack | 707/101 |
| 6,121,968 A | 9/2000 | Arcuri et al. | 715/825 |
| 6,122,647 A | 9/2000 | Horowitz et al. | 707/513 |
| 6,126,306 A | 10/2000 | Ando | 364/419.02 |
| 6,137,911 A | 10/2000 | Zhilyaev | 382/225 |
| 6,141,005 A * | 10/2000 | Hetherington et al. | 715/866 |
| 6,151,643 A | 11/2000 | Cheng et al. | 710/36 |
| 6,154,738 A | 11/2000 | Call | 707/4 |
| 6,167,469 A | 12/2000 | Safai et al. | 710/62 |
| 6,167,523 A | 12/2000 | Strong | 726/21 |
| 6,167,568 A | 12/2000 | Gandel et al. | 717/176 |
| 6,173,316 B1 | 1/2001 | De Boor et al. | 709/218 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,208,338 B1 | 3/2001 | Fischer et al. | 715/705 |
| 6,219,698 B1 | 4/2001 | Iannucci et al. | 709/221 |
| 6,246,404 B1 | 6/2001 | Feigner et al. | 715/708 |
| 6,262,728 B1 | 7/2001 | Alexander | 345/440.1 |
| 6,272,074 B1 * | 8/2001 | Winner | 368/10 |
| 6,272,505 B1 | 8/2001 | De La Huerga | 707/501 |
| 6,282,489 B1 | 8/2001 | Bellesfield et al. | 701/201 |
| 6,291,785 B1 | 9/2001 | Koga et al. | 209/584 |
| 6,292,768 B1 | 9/2001 | Chan | 704/1 |
| 6,295,061 B1 | 9/2001 | Park et al. | 715/764 |
| 6,297,822 B1 | 10/2001 | Feldman | 715/705 |
| 6,300,950 B1 | 10/2001 | Clark et al. | 715/705 |
| 6,308,171 B1 | 10/2001 | De La Huerga | 707/3 |
| 6,311,152 B1 | 10/2001 | Bai et al. | 704/9 |
| 6,311,177 B1 | 10/2001 | Dauerer et al. | 707/2 |
| 6,311,194 B1 | 10/2001 | Sheth et al. | 707/505 |
| 6,320,496 B1 | 11/2001 | Sokoler et al. | 340/470.1 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe | 709/203 |
| 6,338,059 B1 | 1/2002 | Field et al. | 707/4 |
| 6,339,436 B1 | 1/2002 | Amro et al. | 715/714 |
| 6,339,755 B1 | 1/2002 | Hetherington et al. | 704/8 |
| 6,347,398 B1 | 2/2002 | Parthasarathy et al. | 717/178 |
| 6,349,295 B1 | 2/2002 | Tedesco et al. | 707/3 |
| 6,353,926 B1 | 3/2002 | Parthesarathy et al. | 717/170 |
| 6,381,742 B2 | 4/2002 | Forbes et al. | 717/176 |
| 6,382,350 B1 | 5/2002 | Jezewski et al. | 181/290 |
| 6,392,668 B1 | 5/2002 | Murray | 715/38 |
| 6,396,515 B1 | 5/2002 | Hetherington et al. | 715/762 |
| 6,401,067 B2 | 6/2002 | Lewis et al. | 704/275 |
| 6,408,323 B1 | 6/2002 | Kobayashi et al. | 709/100 |
| 6,413,100 B1 | 7/2002 | Dickmeyer et al. | 434/322 |
| 6,415,304 B1 | 7/2002 | Horvitz | 715/205 |
| 6,421,678 B2 | 7/2002 | Smiga et al. | 707/102 |
| 6,424,979 B1 | 7/2002 | Livingston et al. | 715/511 |
| 6,434,567 B1 | 8/2002 | De La Huerga | 707/102 |
| 6,438,545 B1 | 8/2002 | Beauregard et al. | 707/6 |
| 6,441,753 B1 | 8/2002 | Montgomery | 341/34 |
| 6,442,545 B1 | 8/2002 | Feldman et al. | 707/8 |
| 6,442,591 B1 | 8/2002 | Haynes et al. | 709/206 |
| 6,456,304 B1 | 9/2002 | Angiulo et al. | 715/779 |
| 6,470,091 B2 | 10/2002 | Koga et al. | 382/101 |
| 6,473,069 B1 | 10/2002 | Gerpheide | 345/157 |
| 6,493,006 B1 | 10/2002 | Gourdol et al. | 715/825 |

| | | | |
|---|---|---|---|
| 6,477,510 B1 | 11/2002 | Johnson .................. 705/30 |
| 6,480,860 B1 | 11/2002 | Monday ................. 707/102 |
| 6,498,982 B2 | 12/2002 | Bellesfield et al. ......... 701/202 |
| 6,510,504 B2 | 1/2003 | Satyanarayanan ........... 711/170 |
| 6,516,321 B1 | 2/2003 | De La Huerga ........... 707/102 |
| 6,519,557 B1 | 2/2003 | Emens et al. ................. 704/8 |
| 6,519,603 B1 | 2/2003 | Bays et al. ................. 707/102 |
| 6,553,385 B2 | 4/2003 | Johnson et al. .......... 707/104.1 |
| 6,556,972 B1 * | 4/2003 | Bakis et al. ................. 704/277 |
| 6,556,984 B1 | 4/2003 | Zien .......................... 707/2 |
| 6,564,264 B1 | 5/2003 | Creswell et al. ............ 709/245 |
| 6,571,241 B1 | 5/2003 | Nosohara ...................... 707/6 |
| 6,571,253 B1 | 5/2003 | Thompson et al. ...... 707/103 R |
| 6,591,260 B1 | 7/2003 | Schwarzhoff et al. .......... 707/2 |
| 6,595,342 B1 | 7/2003 | Maritzen et al. ............ 194/212 |
| 6,601,075 B1 | 7/2003 | Huang et al. .......... 707/104.1 |
| 6,604,099 B1 | 8/2003 | Chung et al. ................. 707/3 |
| 6,615,131 B1 | 9/2003 | Rennard et al. ............. 701/200 |
| 6,618,733 B1 | 9/2003 | White et al. ................. 707/103 |
| 6,622,140 B1 | 9/2003 | Kantrowitz ................... 707/5 |
| 6,623,527 B1 | 9/2003 | Hamzy ...................... 715/513 |
| 6,625,581 B1 | 9/2003 | Perkowski ................... 705/27 |
| 6,629,079 B1 | 9/2003 | Spiegel et al. .............. 705/26 |
| 6,631,519 B1 | 10/2003 | Nicholson et al. ........... 717/169 |
| 6,636,880 B1 | 10/2003 | Bera ....................... 708/206 |
| 6,643,650 B1 | 11/2003 | Slaughter et al. ............. 707/10 |
| 6,654,734 B1 | 11/2003 | Mani et al. ..................... 707/2 |
| 6,654,932 B1 | 11/2003 | Bahrs et al. ................. 715/507 |
| 6,658,623 B1 | 12/2003 | Schilit et al. ................ 715/513 |
| 6,687,485 B2 | 2/2004 | Hopkins et al. ............. 434/317 |
| 6,694,307 B2 | 2/2004 | Julien ........................ 707/3 |
| 6,697,824 B1 | 2/2004 | Bowman-Amuah ........ 707/229 |
| 6,697,837 B1 | 2/2004 | Rodov ....................... 709/203 |
| 6,708,189 B1 * | 3/2004 | Fitzsimons et al. .......... 707/205 |
| 6,715,144 B2 | 3/2004 | Daynes et al. .............. 717/174 |
| 6,717,593 B1 | 4/2004 | Jennings .................... 715/760 |
| 6,718,516 B1 * | 4/2004 | Claussen et al. ........... 715/513 |
| 6,728,679 B1 | 4/2004 | Strubbe et al. .......... 704/270.1 |
| 6,732,090 B2 | 5/2004 | Shanahan et al. .............. 707/3 |
| 6,732,361 B1 | 5/2004 | Andreoli et al. ............. 719/313 |
| 6,741,994 B1 | 5/2004 | Kang et al. ................. 707/102 |
| 6,742,054 B1 | 5/2004 | Upton, IV .................... 710/6 |
| 6,766,326 B1 | 7/2004 | Cena ........................ 707/101 |
| 6,795,808 B1 | 9/2004 | Strubbe et al. ............. 704/275 |
| 6,802,061 B1 | 10/2004 | Parthasarathy et al. ...... 717/173 |
| 6,829,631 B1 | 12/2004 | Forman et al. ............. 709/202 |
| 6,845,499 B2 | 1/2005 | Srivastava et al. ........... 717/100 |
| 6,857,103 B1 | 2/2005 | Wason ...................... 715/709 |
| 6,859,908 B1 | 2/2005 | Clapper .................... 715/224 |
| 6,868,525 B1 | 3/2005 | Szabo ...................... 715/738 |
| 6,874,125 B1 | 3/2005 | Carroll et al. ............... 715/705 |
| 6,874,143 B1 | 3/2005 | Murray et al. ............. 717/173 |
| 6,880,129 B1 | 4/2005 | Lee et al. .................. 715/763 |
| 6,883,137 B1 | 4/2005 | Girardot et al. ............ 715/513 |
| 6,898,604 B1 | 5/2005 | Ballinger et al. ............ 707/101 |
| 6,901,402 B1 | 5/2005 | Corston-Oliver et al. .... 701/101 |
| 6,904,560 B1 | 6/2005 | Panda ...................... 715/202 |
| 6,925,457 B2 | 8/2005 | Britton et al. ................. 707/1 |
| 6,925,470 B1 | 8/2005 | Sangudi et al. ............. 707/102 |
| 6,944,857 B1 | 9/2005 | Glaser et al. ............... 717/173 |
| 6,950,831 B2 | 9/2005 | Haley .................... 707/104.1 |
| 6,950,982 B1 | 9/2005 | Dourish ................... 715/512 |
| 6,957,385 B2 | 10/2005 | Chan et al. ................ 715/504 |
| 6,963,867 B2 | 11/2005 | Ford et al. .................. 707/3 |
| 6,964,010 B1 | 11/2005 | Sharp ...................... 715/507 |
| 6,975,983 B1 | 12/2005 | Fortescue et al. ............ 704/9 |
| 6,976,090 B2 | 12/2005 | Ben-Shaul et al. ......... 709/246 |
| 6,976,209 B1 | 12/2005 | Storisteanu et al. ........ 715/512 |
| 6,981,212 B1 | 12/2005 | Claussen et al. ............ 715/205 |
| 6,986,104 B2 | 1/2006 | Green et al. ................. 715/523 |
| 6,990,654 B2 | 1/2006 | Carroll, Jr. ................. 717/109 |
| 7,003,522 B1 | 2/2006 | Reynar et al. ................ 707/10 |
| 7,013,289 B2 | 3/2006 | Horn et al. .................. 705/26 |
| 7,024,658 B1 | 4/2006 | Cohen et al. ................ 717/117 |
| 7,028,312 B1 | 4/2006 | Merrick et al. ............. 719/330 |
| 7,032,174 B2 | 4/2006 | Montero et al. ............. 715/257 |
| 7,039,859 B1 | 5/2006 | Sundaresan ................ 715/229 |
| 7,051,076 B2 | 5/2006 | Tsuchiya ................... 709/206 |
| 7,082,392 B1 | 7/2006 | Butler et al. ............... 704/233 |
| 7,100,115 B1 | 8/2006 | Yennaco ................... 715/748 |
| 7,113,976 B2 | 9/2006 | Watanabe ................. 709/206 |
| 7,146,564 B2 | 12/2006 | Kim et al. ................. 715/235 |
| 7,216,351 B1 | 5/2007 | Maes ...................... 719/328 |
| 7,237,190 B2 | 6/2007 | Rollins et al. ............. 715/234 |
| 7,281,245 B2 | 10/2007 | Reynar et al. ............. 717/173 |
| 7,302,634 B2 | 11/2007 | Lucovsky et al. ........... 715/200 |
| 7,305,354 B2 | 12/2007 | Rodriguez et al. ........... 705/26 |
| 7,392,479 B2 | 6/2008 | Jones et al. ................. 715/513 |
| 7,421,645 B2 | 9/2008 | Reynar ..................... 715/206 |
| 7,454,459 B1 | 11/2008 | Kapoor et al. ............. 709/203 |
| 2001/0029605 A1 | 10/2001 | Forbes et al. ............... 717/170 |
| 2001/0041328 A1 | 11/2001 | Fisher ...................... 434/157 |
| 2001/0042098 A1 | 11/2001 | Gupta et al. ............... 709/206 |
| 2001/0049702 A1 | 12/2001 | Najmi ....................... 707/513 |
| 2001/0056461 A1 | 12/2001 | Kampe et al. .............. 709/201 |
| 2002/0002590 A1 | 1/2002 | King et al. ................. 709/206 |
| 2002/0003469 A1 | 1/2002 | Gupta ...................... 340/407.1 |
| 2002/0003898 A1 | 1/2002 | Wu .......................... 382/187 |
| 2002/0004803 A1 | 1/2002 | Serebrennikov ............ 715/513 |
| 2002/0023113 A1 | 2/2002 | Hsing et al. ............... 715/513 |
| 2002/0023136 A1 | 2/2002 | Silver et al. .............. 709/206 |
| 2002/0026450 A1 | 2/2002 | Kuramochi ............... 707/104.1 |
| 2002/0035581 A1 | 3/2002 | Reynar et al. .............. 715/513 |
| 2002/0038180 A1 | 3/2002 | Bellesfield et al. .......... 701/202 |
| 2002/0065110 A1 | 5/2002 | Enns et al. ................. 455/566 |
| 2002/0065891 A1 | 5/2002 | Malik ...................... 709/206 |
| 2002/0066073 A1 | 5/2002 | Lienhard et al. ............. 717/105 |
| 2002/0078222 A1 | 6/2002 | Compas et al. ............. 709/232 |
| 2002/0091803 A1 | 7/2002 | Imamura et al. ............ 709/220 |
| 2002/0099687 A1 | 7/2002 | Krishnaprasad et al. ........ 707/1 |
| 2002/0100036 A1 | 7/2002 | Moshir et al. ............... 717/173 |
| 2002/0103829 A1 | 8/2002 | Manning et al. ............ 715/513 |
| 2002/0104080 A1 | 8/2002 | Woodard et al. ............ 717/176 |
| 2002/0110225 A1 | 8/2002 | Cullis ....................... 379/67.1 |
| 2002/0111928 A1 | 8/2002 | Haddad ...................... 707/1 |
| 2002/0120685 A1 | 8/2002 | Srivastava et al. ........... 709/203 |
| 2002/0129107 A1 | 9/2002 | Loughran et al. ........... 709/206 |
| 2002/0133523 A1 | 9/2002 | Ambler et al. ............. 715/536 |
| 2002/0149601 A1 | 10/2002 | Rajarajan et al. ........... 345/619 |
| 2002/0156774 A1 | 10/2002 | Beauregard et al. ............ 707/3 |
| 2002/0156792 A1 | 10/2002 | Gombocz et al. ........... 707/100 |
| 2002/0169802 A1 | 11/2002 | Brewer et al. .............. 707/513 |
| 2002/0175955 A1 | 11/2002 | Gourdol et al. ............. 345/821 |
| 2002/0178008 A1 | 11/2002 | Reynar ..................... 704/272 |
| 2002/0178182 A1 | 11/2002 | Wang et al. ............... 715/501.1 |
| 2002/0184247 A1 | 12/2002 | Jokela et al. ............... 707/204 |
| 2002/0188941 A1 | 12/2002 | Cicciarelli et al. ........... 717/175 |
| 2002/0196281 A1 | 12/2002 | Audleman et al. ........... 715/762 |
| 2002/0198909 A1 | 12/2002 | Huynh et al. ............... 715/513 |
| 2003/0002391 A1 * | 1/2003 | Biggs ........................ 368/82 |
| 2003/0005411 A1 | 1/2003 | Gerken ..................... 717/120 |
| 2003/0009489 A1 | 1/2003 | Griffin ...................... 715/500 |
| 2003/0014745 A1 | 1/2003 | Mah et al. ................. 717/170 |
| 2003/0025728 A1 | 2/2003 | Ebbo et al. ................. 715/744 |
| 2003/0046316 A1 | 3/2003 | Gergic et al. .............. 707/513 |
| 2003/0050911 A1 | 3/2003 | Lucovsky et al. ............ 707/1 |
| 2003/0051236 A1 | 3/2003 | Pace et al. ................. 717/177 |
| 2003/0056207 A1 | 3/2003 | Fischer et al. ............. 717/174 |
| 2003/0081791 A1 | 5/2003 | Erickson et al. ............ 380/282 |
| 2003/0083910 A1 | 5/2003 | Sayal et al. ................... 705/7 |
| 2003/0084138 A1 | 5/2003 | Tavis et al. ................. 709/223 |
| 2003/0097318 A1 | 5/2003 | Yu et al. ..................... 705/35 |
| 2003/0101190 A1 | 5/2003 | Horvitz et al. .............. 707/100 |
| 2003/0101204 A1 | 5/2003 | Watson ..................... 708/206 |
| 2003/0101416 A1 | 5/2003 | McInnes et al. ............ 715/513 |
| 2003/0106040 A1 | 6/2003 | Rubin et al. ................ 717/106 |

| | | | | |
|---|---|---|---|---|
| 2003/0115039 A1 | 6/2003 | Wang .................... 704/4 |
| 2003/0121033 A1 | 6/2003 | Peev et al. ............ 717/175 |
| 2003/0126136 A1 | 7/2003 | Omoigui ................ 707/10 |
| 2003/0140308 A1 | 7/2003 | Murthy et al. ........ 715/500 |
| 2003/0154144 A1 | 8/2003 | Pokorny et al. ....... 705/28 |
| 2003/0158841 A1 | 8/2003 | Britton et al. .......... 707/3 |
| 2003/0158851 A1 | 8/2003 | Britton et al. ........ 707/100 |
| 2003/0167445 A1 | 9/2003 | Su et al. ............... 715/513 |
| 2003/0172343 A1 | 9/2003 | Leymaster et al. ... 715/500 |
| 2003/0177341 A1 | 9/2003 | Devillers ............. 712/227 |
| 2003/0182391 A1 | 9/2003 | Leber et al. .......... 709/217 |
| 2003/0192040 A1 | 10/2003 | Vaughan .............. 717/173 |
| 2003/0195937 A1 | 10/2003 | Kircher et al. ....... 709/207 |
| 2003/0212527 A1 | 11/2003 | Moore et al. ......... 702/179 |
| 2003/0220795 A1 | 11/2003 | Araysantiparb et al. ..... 704/275 |
| 2003/0229593 A1 | 12/2003 | Raley et al. .......... 705/55 |
| 2003/0233330 A1 | 12/2003 | Raley et al. .......... 705/55 |
| 2004/0002939 A1 | 1/2004 | Arora et al. ............ 707/1 |
| 2004/0003389 A1 | 1/2004 | Reynar et al. ........ 717/178 |
| 2004/0006564 A1 | 1/2004 | Lucovsky et al. ...... 707/10 |
| 2004/0006741 A1 | 1/2004 | Radja et al. .......... 715/513 |
| 2004/0024875 A1 | 2/2004 | Horvitz et al. ....... 709/226 |
| 2004/0039990 A1 | 2/2004 | Bakar et al. |
| 2004/0044959 A1 | 3/2004 | Shanmugasundaram et al. ........................... 715/513 |
| 2004/0068694 A1 | 4/2004 | Kaler et al. .......... 715/513 |
| 2004/0083218 A1 | 4/2004 | Feng .................... 707/100 |
| 2004/0133846 A1 | 7/2004 | Khoshatefeh et al. ....... 715/500 |
| 2004/0143581 A1 | 7/2004 | Bohannon et al. ... 707/100 |
| 2004/0165007 A1 | 8/2004 | Shafron ................ 715/781 |
| 2004/0199861 A1 | 10/2004 | Lucovsky .............. 715/500 |
| 2004/0201867 A1 | 10/2004 | Katano ................ 358/1.15 |
| 2004/0236717 A1 | 11/2004 | Demartini et al. ....... 707/1 |
| 2005/0050164 A1 | 3/2005 | Burd et al. ........... 709/217 |
| 2005/0055330 A1 | 3/2005 | Britton et al. .......... 707/1 |
| 2005/0094850 A1 | 5/2005 | Nakao .................. 382/103 |
| 2005/0108195 A1 | 5/2005 | Yalovsky et al. ........ 707/1 |
| 2005/0120313 A1 | 6/2005 | Rudd et al. .......... 715/866 |
| 2005/0187926 A1 | 8/2005 | Britton et al. .......... 707/3 |
| 2006/0173674 A1 | 8/2006 | Nakajima et al. ...... 704/9 |

FOREIGN PATENT DOCUMENTS

| | | |
|---|---|---|
| CN | ZL 200410005390.8 | 10/2008 |
| EP | 0 364 180 A2 | 4/1990 |
| EP | 0481784 A2 | 4/1992 |
| EP | 0598511 A2 | 5/1994 |
| EP | 0872827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| EP | 1 447 754 A1 | 8/2004 |
| JP | 64-88771 | 4/1989 |
| JP | 05-174013 | 7/1993 |
| JP | 08-272662 | 10/1996 |
| JP | 09-138636 | 5/1997 |
| JP | 10-171827 | 6/1998 |
| JP | 2000-222394 | 8/2000 |
| JP | 2000-231566 | 8/2000 |
| JP | 2001-014303 | 1/2001 |
| JP | 2001-125994 | 5/2001 |
| JP | 2001-522112 | 11/2001 |
| JP | 2002-041353 | 2/2002 |
| JP | 2002163250 A | 6/2002 |
| JP | 2002-222181 | 8/2002 |
| JP | 2003-141174 | 5/2003 |
| WO | WO 95/07510 A1 | 3/1995 |
| WO | WO 99/17240 A1 | 4/1999 |
| WO | WO 00/54174 A1 | 9/2000 |
| WO | WO 00/67117 | 11/2000 |
| WO | WO 00/73949 A1 | 12/2000 |
| WO | WO 01/18687 A1 | 3/2001 |
| WO | WO 01/37170 A2 | 5/2001 |
| WO | WO 0186390 A2 | 11/2001 |
| WO | WO 02/99627 A1 | 1/2002 |
| WO | WO 02/15518 A2 | 2/2002 |
| WO | WO 02/42928 A1 | 5/2002 |
| WO | WO 2004/012099 A2 | 2/2004 |

OTHER PUBLICATIONS

Towers, J. Tarin. Visual Quickstart Guide: Dreamweaver 2 for Windows and Macintosh. 1999. Peachpit Press. pp. 150-151.*

"XML Schema Part 2: Datatypes," W3C, May 2, 2001, <http://www.w3.org/TR/2001/REC-xmlschema-2-20010502/> pp. 1-146.*

C.A.S. Santos, L.F.G. Soares, G.L. de Souza, and J.P. Courtiat, Design Methodology and Formal Validation of Hypermedia Documents, *Proceedings of the Sixth ACM International Conference on Multimedia*, (1998), p. 39-48.

Loren Taveen, Will Hill, and Brian Amento, Constructing, Organizing, and Visualizing Collections of Topically Related Web Resources, *ACM Transactions on Computer-Human Interaction*, vol. 6, No. 1, (Mar. 1999), p. 67-94.

Rob Barrett, Paul P. Maglio, and Daniel C. Kellem, How to Personalize the Web, *Conference Proceedings on Human Factors in Computing Systems*, (1997), p. 75-82.

Matthew Marx and Chris Schmandt, CLUES: Dynamic Personalized Message Filtering, *Proceedings of the ACM 1996 Conference on Computer Supported Cooperative Work*, (1996), p. 113-121.

Karl M. Goschka and Jurgen Falb, Dynamic Hyperlink Generation for Navigation in Relational Databases, *Proceedings of the Tenth ACM Conference on Hypertext and Hypermedia: Returning to Our Diverse Roots*, (1999), p. 23-24.

Alex Pentland, Perceptual User Interfaces: Perceptual Intelligence, *Commun. ACM*, 43, 3 (Mar. 2000), p. 35-44.

Mark A. Stairmand, Textual Context Analysis for Information Retrieval, *Proceedings of the 20th Annual International ACM SIGIR Conference on Research and Development in Information Retrieval*, (1997), p. 140-147.

Robert J. Glushko, Jay M. Tenebaum, and Bart Meltzer, An XML Framework for Agent-Based E-Commerce, *Commun. ACM* 42, 3 (Mar. 1999) p. 106.

Technique for Automatically Correcting Words in Text; Karen Kukich;*ACM Comput. Surv.*, 24, 4 (Dec. 1992); pp. 377-439.

Putting People First: Specifying Proper Names in Speech Interfaces, Matt Marx and Chris Schmandt; *Proceedings of the ACM Symposium on User Interface Software and Technology*; 1994; pp. 29-37.

Interface and execution models in the fluke kernel; Bryan Ford, Mike Hibler, Jay Lepreau, Roland McGrath and Patrick Tullman; *Proceedings of the third symposium on operating systems design and implementation*, (1999) p. 101-115.

Exploring the applications user-expertise assessment for intelligent interfaces; Michel C. Desmarais and Jiming Liu; *Proceedings of the conference on human factors in computing systems*, (1993) p. 308-313.

Future directions in user-computer interface software; James D. Foley; *Conference proceedings on organizational computer systems*, (1991) p. 289-297.

Human-computer interface development: concepts and systems for its management H. Rex Hartson and Deborah Hix; *ACM Comput. Surv.* 1 (Mar. 1989) p. 5-92.

Integrating computer technology, people technology; strategies and case studies from Georgia Tech's Graphics, Visualization and Usability Center, Jim Foley; *Proceedings of the workshop on advanced visual interfaces*, (1994) p. 34-43.

Command management system for next-generation user input; M. Tsai, P. Reiher and G.J. Popek; *Proceedings of the seventh workshop on hottopics in operating systems*, (1999) p. 17984.

U.S. Appl. No. 09/818,157, filed Mar. 27, 2001, entitled "Automatically Adding Proper Names to a Database."

U.S. Appl. No. 09/841,265, filed Apr. 24, 2001, entitled "Method and System for Applying Input Mode Bias."

U.S. Appl. No. 09/841,266, filed Apr. 24, 2001, entitled "Method and System for Providing Electronic Commerce Actions Based on Semantically Labeled Strings."
U.S. Appl. No. 09/906,552, filed Jul. 16, 2001, entitled "Method and System for Providing Restricted Actions for Recognized Semantic Categories."
U.S. Appl. No. 09/906,467, filed Jul. 16, 2001, entitled "Application Program Interfaces for Semantically Labeling Strings and Providing Actions Based on Semantically Labeled Strings."
U.S. Appl. No. 09/907,418, filed Jul. 17, 2001, entitled "Method and System for Defining Semantic Categories and Actions."
U.S. Appl. No. 09/588,411, filed Jun. 6, 2000, entitled "Method and System for Semantically Labeling Strings and Providing Actions Based on Semantically Labeled Strings."
U.S. Appl. No. 10/154,630, filed May 23, 2002, entitled "Method, System, and Apparatus for Converting Numbers Based Upon Semantically Labeled Strings."
U.S. Appl. No. 10/140,544, filed May 7, 2002, entitled "Method, System, and Apparatus for Converting Numbers Between Measurement Systems Based Upon Semantically Labeled Strings."
U.S. Appl. No. 10/155,680, filed May 23, 2002, entitled "Method, System, and Apparatus for Converting Currency Values Based Upon Semantically Labeled Strings."
U.S. Appl. No. 10/179,810, filed Jun. 25, 2002, entitled "Method, System, and Apparatus for Performing Custom Actions on Digital Content."
U.S. Appl. No. 10/178,680, filed Jun. 24, 2002, entitled "System and Method for Incorporating Smart Tags in Online Content."
U.S. Appl. No. 10/179,438, filed Jun. 25, 2002, entitled "Method and System for Dynamically Providing Actions Associated with Semantically Labeled Strings."
U.S. Appl. No. 10/184,298, filed Jun. 27, 2002, entitled "Method and System for Associating Actions with Semantic Labels in Electronic Documents."
Microsoft Computer Dictionary, Fifth Edition, Microsoft Press, p. 409.
U.S. Appl. No. 10/426,446, filed Apr. 49, 2003, entitled "Methods and System For Recognizing Names In A Computer-Generated Document and For Providing Helpful Actions Associated With Recognized Names."
Willisson, Pace, et al., "UNIX Man Pages: ispell," http://www.comp.lancs.ac.uk/computing/users/eiamjw/unix/chap8.html, http://www.physics.umn.edu/cgi-bin/man-cgi?spell, http://www.vorlesungen.uni-osnabrueck.de/informatik/shellscript/Html/Man/_Man_NeXT_html/html, http://duplex.hypermart.net/books.bsd/501-504.html, pp. 1-20.
Kuenning, Geoff, "International Ispell," Version 3.1.00, Oct. 8, 1993, http:// www.rt.com/man/findaffix.1.html, http://www.csee.usf.edu/cgi-bin/man-cig?ispell, http://fmg-www.cs.ucla.edu/geoff/ispell.html, pp. 1-33.
Kuenning, Geoff; "Ispell, v. 3.1," http://theochem.ki.ku.dk/on_line_docs/ispell/ispell_1.html, pp. 1-6.
"UNIX Man Pages: sed," http://www.calpoly.edu/cgi-bin/man-cgi?spell+1, pp. 1-14.
McMahon, Lee. E., "SED—A Non-Interactive Text Editor," Bell Laboratories, Murray Hill, New Jersey 07974, pp. 1-15.
Beitner, N. D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12.
IBM Corporation, IBM Research Disclosure #368; "Multimedia Hyperlinks Automatically Created For Reference Documents," *IBM Technical Disclosure Bulletin*, Jun. 1993, pp. 1-5.
*The Complete LINUX™ Operating System 5.2 Deluxe*, Red Hat,® Macmillan Digital Publishing USA, A Viacom Company, Red Hat Software, Inc., ISBN 1-57595-199-1B, pp. 1-385.
*User Manual For AddressMate and AddressMate Plus*, CoStar Corporation, AddressMate Software, 1994-1995, pp. 1-210.
Getting Results With Microsoft® Office 97, *Real World Solutions For The Work You Do*, Microsoft Corporation, pp. 1-703.
*InfoCentral™ 7*, User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531.
Novell GroupWise User's Guide for Windows 16-Bit Version 5.2, Novell, Inc., 1993-1997, pp. 1-231.
Novell GroupWise User's Guide for Windows 32-Bit Version 5.2, Novell, Inc., 1998, pp. 1-318.
Claris Em@iler Getting Started User's Guide, For Macintosh, Claris Corporation, 1995-1997.
Developer's Guide To Apple Data Detectors, For Version 1.0.2., Apple Computer, Inc., 1997, pp. 1-33.
Apple Data Detectors User's Manual, Apple Computer, Inc., 1997, pp. 1-15.
Nardi, Bonnie A.; Miller, James R.; Wright, David J., "Collaborative, Programmable Intelligent Agents," Jim Miller/Miramontes Computing, Apple Computer Advanced Technology Group, Mar. 1998, pp. 1-11.
Hewkin, "Smart Tags-the Distributed-Memory Resolution", IEE Review, Jun. 22, 1989, pp. 203-206.
Measuring Units Conversion Table—http://web.archie.org- 1997 Internet French Property, pp. 1-4.
Driza, Scott, "Learn Word 2000 VBA Document Automation", Wordware Publishing Inc., 2001, 6 pp.
Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.
U.S. Appl. No. 10/164,960, filed Jun. 6, 2002, entitled "Providing Contextually Sensitive Actions and Help Content in Computer-Generated Documents".
U.S. Appl. No. 10/164,260, filed Jun. 5, 2002, entitled "Mechanism for Downloading Software Components from a Remote Source for Use by a Local Software Application".
U.S. Appl. No. 10/731,899, filed Dec. 9, 2003, entitled "Mechanism for Downloading Components Associated with XML Documents and Smart Documents".
U.S. Appl. No. 10/366,141, filed Feb. 13, 2003, entitled "Linking Elements of a Document to Corresponding Fields, Queries and/or Procedures in a Database".
U.S. Appl. No. 10/377,258, filed Feb. 28, 2003, entitled "Method and System for Enhancing Paste Functionality of a Computer Software Application".
U.S. Appl. No. 10/608,267, filed Jun. 27, 2003, entitled "Leveraging Markup Language Data for Semantically Labeling Text Strings and Data and for Providing Actions Based on Semantically Labeled Text Strings and Data".
U.S. Appl. No. 10/780,376, filed Feb. 17, 2004, entitled "Methods and Systems for Providing Automatic Actions on Recognized Text Strings in a Computer-Generated Document".
U.S. Appl. No. 10/184,190, filed Jun. 27, 2002, entitled "System and Method for Providing Namespace Related Information".
Menu Customizing, IBM Technical Disclosure Bulletin, vol. 34, No. 1, Jun. 1991, pp. 91-92 (4 pp. total).
Perry, Brad, et al., "Discovering Similar Resources by Content Park-Linking", Proceedings of the Sixth International Conference on Information and Knowledge Management, published by ACM Press 1997, pp. 317-324.
Schulz, Charles, "Writing Applications for Uniform Operation on a Mainframe or PC: A Metric Conversion Program", Lockheed Missles & Space Company, Inc., Sunnyvale, CA, May 1990, pp. 348-361.
Devanbue, P. et al., "Chime: customizable hyperlink insertion and maintenance engine for software engineering environments", Software Engineering, Publication date: 1999, ISBN: 1-58113-07400.
"Using Flyswat", http://www.flywsat.com/using.html, download date: Sep. 28, 1999, 1 pp.
"What is Flyswat", http://www.flyswat.com, download date: Sep. 28, 1999, 5 pp.
"Intelligent Text Processing: About", http://www.syntalex.co.uk/about/about.html, download date: Aug. 7, 1999, 1 pp.
"Intelligent Text Processing: Automatic Cross-Referencing", http://www.syntalex.co.uk/services/acrl.html, download date Aug. 7, 1999, 3 pp.

"Intelligent Text Processing: Case Study: Context", http://www.syntalex.co.uk/casestudies/context.html, download date: Aug. 7, 1999, 3 pp.

"Integrating with External Systems: iPlanet™ Unified Development Server", Sun Microsystems, Inc., Ver. 5.0, Aug. 2001, pp. 127-156.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/htm/lat_xmltools_map_intro_zkqb.asp..., Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw..., Microsoft Corporation, 1999-2001, pp. 1.

"BizTalk Server 2002 Compiling Maps", http://msdn.microsoft.com/library/en-us/bts_2002/htm/lat_xmltools_map_concept_drgl.a..., Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a..., Microsoft Corporation, 1999-2001, pp. 1-2.

"BizTalk Server 2002 View Links and Functoids by Using Grid Preview", http://msdn.microsoft.com/library/en-us/bts_2002/htm/lat_xmltools_map_check_fuwn.as..., Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/press/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

M. Fernandez et al., "SilkRoute: trading between relations and XML", Computer Networks, vol. 33, No. 1-6, Jun. 2000, pp. 723-745.

V. Braganholo, "Updating Relational Databases Through XML Views", Technical Report, Sep. 2002, pp. 1-61.

G. Falquet et al., "Design and Analysis of Active Hypertext Views on Databases", Information Sciences Institute, Jan. 2002, pp. 1-24.

S. Ceri et al., "Deriving Production Rules for Incremental View Maintenance", Proceedings of the 17th International Conference on Very Large Data Bases, Sep. 1991, pp. 577-589.

A. Bonifati, "Active Behaviors within XML Document Management", EDBT Ph. D. Workshop, Mar. 2000, pp. 1-4.

"Integrated Development Enviorment (IDE)", http://web.archive.org/web/20020602032242/http:altova.com/products_ide.html, Jun. 2002, pp. 1-2.

Arbortext, "Arbortext and Accessibilty", http://web.archive.org/web/20021219133536/www.arbortext.com/html/accessibility.html, Dec. 2002, pp. 1-5.

Arbortext, "XML Compliance, 100% Pure XML", http:web.archive.org/web/20021209185855/www.arbortext.com/html/xml_compliance, Dec. 2002, pp. 1-3.

Arbortext, "Schemas", http://web.archive.org/web/20021221023148/www.arbortext.com/html/schemas.html, Dec. 2002, pp. 1-3.

Arbortext, "Arbortext's Support for XSL-FO", http://web.archive.org/web/20021221021632/www.arbortext.com/html/xsl-fo.html. Dec. 2002, pp. 1-4.

Corel, "Corel XMetal4, Making XML Content Creation Easy", http://web.archive.org/web/20031118215158/www.corel.com/servlet/Satellite?pagename, Nov. 2003, pp. 1-2.

Corel, "Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.

Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com.com/5102-6387-104585.html, 3 pp.

Homer, Alex et al., Professional Active Services Pages, 1997, Wrox Press Ltd., Section"Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Brockschmidt, K., "Inside OLE, Second Edition", 1995, Microsoft Press, p. 169.

Toth, V., "Visual C++ 4 Unleashed", 1996, Sams Publishing, p. 174.

Sriram, V., "ComponentXchange: An E-Exchange for Software Components", Master Thesis, CitSeer, May 2001, pp. i-v, 1-77.

Bosak, "XML: The Universal Publishing Format", SGML/XML Europe '98, May 1998, pp. A1-C17.

Kristensen, "Template Resolution in XML/HTML", Computer Networks and ISDN Systems, vol. 30, 1998, pp. 239-249.

Fan et al., "FormPlus: A Form Authoring Toolkit", Proceedings of the Fourteenth Annual Computer Software and Applications Conference, Oct. 31, 1990-Nov. 2, 1990, pp. 255-260.

Boone, "Concept Features in Re: Agent, An Intelligent Email Agent", Proceedings of the 2nd International Conference on Autonomous Agents, May 9-13, 1998, pp. 141-148.

Takkinen et al., "CAFÉ: A Conceptual Model for Managing Information in Electronic Mail", Proceedings of the Annual Hawaii International Conference on System Sciences, 1998, pp. 44-53.

"Altova markup your mind!" http://web.archive.org/web/20021204211721/http://altova.com/products_ide.html, Dec. 2002, pp. 1-3.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.cett.msstate.edu/create/howto/smart_tags.pdf, 7 pp.

European Communication, Application No. 05 000 506.5-1527 dated Apr. 19, 2006.

European Communication dated Nov. 17, 2006 in EP 03 011 851.7-2211.

European Communication dated Nov. 9, 2006 in EP 03010292.5.

"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.

"Microsoft Measurement Converter Smart Tag—Chinese Version", http://www.jiyang.gov/cn/laiying/My%20Pictures/%

E8%B4%E5%BA%86%E8%BE%89/office2003/FILES/PFILES/ COMMON/MSSHARED/SMARTTAG/CMEASURE/1033/ CHMCABT.HTM, retrieved on Nov. 7, 2006, 2 pgs.

Harold, E.R., "XML: Extensible Markup Language", IDG Books Worldwide, Books 24x7.com printout, 1998, 20 pp.

Marais, Hannes, "Supporting Cooperative and Personal Surfing With a Desktop Assistant", 1997, ACM Press, pp. 129-138.

European Communication dated Sep. 25, 2006 in EP 03 01 4181.

World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.

World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.

European Communication dated Feb. 16, 2007 cited in European Application No. 04 003 683.2-2211.

Anonymous, "Adding Data from Other Sources in PowerPoint 2002," Jul. 2002, Internet article, XP-002420700, A Professional Approach Series the E-Zine Approach, http://www.glencoe,com/ps/computered/pas/article.php4?articleId-437, 8 pgs.

Rice, F.C., "Transform XML Files with XSLT When Importing into Microsoft Excel 2002," Jul. 2001, Internet article, XP-002420701, http://msdn2.microsoft.com/en-us/library/aa140055(office.10,d=printer).aspx 9 pgs.

Johnson, L., "What's So Special About Paste Special?", Jun. 2002, Internet article, XP-002420702, http://pubs.logicalexpressions.com/Pub0009/LPMArticle.asp?ID=40, 5 pgs.

Anonymous, "Moving and Copying Text Tutorial," Aug. 17, 2001, Internet Article, XP-002307566, http://tutorials.findtutorials.com/read/category/102/id/342/p/3, 4 pgs.

Bluhcta et al., "Assigning Possession Tags to Passed Text," Morgan Kaufmann Publishers Inc., 2000, pp. 234-240.

David D. Lewis et al., "A Sequential Algorithm for Training Text Classifiers," Spring-Verlag New York, Inc., 1994, pp. 1-10.

Russian Official Action dated Oct. 11, 2008 cited in Russian Application No. 2003118722.

Pershikov, V.I., "Explanatory Dictionary in Informatics," Finances and Statistics, Moscow, 1991 (in Russian with translated sections) 5 pgs.

European Communication dated Sep. 25, 2007 cited in European Application No. 03 014 181.6-1243.

Japanese Official Action dated Oct. 19, 2007 cited in Japanese Application No. 2003-128417.

Rubin, Charles, "Microsoft Word 2000 Official Manual," First Edition, Nikkei BP Soft Press, Inc., Aug. 2, 1999, pp. 215-217.

Malaysian Search Report dated Aug. 2, 2007 cited in Malaysian Application No. PI 20040265.

Rubin, C., "Microsoft Word 2000 Official Manual", First Edition, Nikkei BP Soft Press, Inc., Aug. 2, 1999, pp. 215-217.

M. Stowe, "XML in Excel and the Spreadsheet Component", Microsoft Corporation, Aug. 2001, 6 pgs.

European Communication Summons to Attend Oral Proceedings dated Mar. 4, 2008 in EP 05 000 506.5-1527.

European Communication Summons to Attend Oral Proceedings dated Mar. 10, 2008 in EP 03 01 0292.5-1527.

Singapore Examination Reported (conducted by Austrian Patent Office) dated Jan. 25, 2008 cited in SG Application No. 200500214-2.

Chinese Official Action dated Dec. 28, 2007 cited in Application No. 200410005390.8.

Chinese Official Action dated Jan. 4, 2008 cited in Application No. 200510009487.0.

Wei Ying-bin et al., "A New Technology ColdFusion of Realizing Dynamic Webpage," 2000, 6 pgs. (English language translation, pp. 1-6).

European Examination Report dated Mar. 4, 2006 cited in EP Application No. 02 014 717.9-1527.

Russian Official Action dated Jan. 11, 2008 cited in Russian Application No. 2004105880/09(006292).

V. Doroth et al., "Modern Computer Vocabulary," St. Petersburg, BHV-Peterburg, 2001, p. 465 (with English language translation).

Japanese Office Action dated Oct. 10, 2008 cited in Application No. 2004-037158.

Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53.

Chinese Office Action dated Oct. 17, 2008 cited in Application No. 03145242.6.

Polish Official Letter dated Jun. 24, 2008 cited Polish Application No. P 365553.

Ghamrawi et al., "Collective Multi-Label Classification," ACM, 2005, pp. 195-200.

Polish Official Action dated Jul. 21, 2008 cited in Polish Application No. P 364854.

Japanese Office Action dated Jul. 18, 2008 cited in Japanese Application No. 2002-207514.

"The Spatial Smart Tag", Geomatic Technologies, Mar. 10, 2005, 2 pp.

Harmon, D., "Microsoft MapPoint 2002", Geoworld Quick-Take Reviews, Aug. 2001, 3 pp.

Irie R. et al., "Resources for Place Name Analysis", May 28, 2004, 4 pp.

Rajabifard, A. et al., "Creating an Enabling Platform for the Delivery of Spatial Information", Spatial Sciences Institute Biennial Conference, Sep. 12, 2005, 10 pp.

Camarda, B., Special Editing Using® Microsoft® Office Word 2003, Que, Dec. 12, 2003, pp. 1-5.

Ivens, K., Office XP Smart Tags, Microsoft, Mar. 6, 2002, pp. 1-4.

Frye, C., Microsoft Office Systems: Step by Step, Microsoft Press, 2003 Edition, Sep. 3, 2003, pp. 1-6.

European Search Report dated Dec. 12, 2006 in European Application No. 05 105 000.3-1527.

European Examination Report dated Oct. 9, 2007 in European Application No. 05 105 000.3-1527.

European Preliminary Opinion dated Aug. 27, 2008 cited in European Application No. 04002224.6-1527 / 1447754.

European Communication Minutes of Oral Proceedings and Decision dated Sep. 15, 2008 in EP 05 000 506.5-1527.

Chinese Official Action dated Dec. 7, 2007 in Chinese Application No. 200510088529.4.

Chinese Second Official Action dated Aug. 15, 2008 in Chinese Application No. 200510088529.4.

Chilean Second Office Action cited in Chilean Application No. 67-2005.

Malaysian Official Action dated Aug. 29, 2008 cited in Malaysian Application No. PI 20031902.

Polish Official Action dated Aug. 27, 2008 cited in Polish Application No. P360520.

Polish Second Official Action dated Oct. 28, 2008 cited in Polish Application No. P36553.

Australian First Official Action dated Oct. 21, 2008 cited in Application No. 2003204800.

Sharon Oviatt et al., "Integration and Synchronization of Input Modes during Multimodal Human-Computer Interaction," CHI 97, Atlanta, Georgia, Mar. 22-27, 1997, pp. 415-422.

European Statement regarding Grounds of Appeal dated Jan. 13, 2009 cited in Application No. 04 002 224.6.

Hara, T. et al., "Inside Microsoft.NET-Complete Explanation, 'What Microsoft Aims For'", msdn magazine, No. 6, pp. 20-35, ASCII, Japan, Sep. 18, 2000, 19 pp.

Shiroiwa, K., "iMac&iBook, Must-see for User, Full of Recommended Setting Methods and Specially Selected Tips, Mastering Mac OS9", MacPeople, ASCII Corporation, Japan, Dec. 3, 1999, vol. 5, No. 24, p. 50 (in Japanese—no translation yet).

(Previously cited) Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English language translation).

European Summons to Attend Oral Proceedings dated Feb. 26, 2009 cited in European Application No. 0301283.0-2211.

European Communication dated Mar. 18, 2009 cited in European Application No. 04003683.2-2211.

European Summons to Attend Oral Proceedings dated Mar. 20, 2009 cited in European Application No. 03012830.0.

Australian First Examiner's Report dated Sep. 15, 2008 cited in Australian Application No. 2003204379.
Japanese Final Official Action dated Nov. 25, 2008 cited in Japanese Application No. 2002-207514.
Japanese Official Action dated Feb. 6, 2009 cited in Japanese Application No. 2003-180218.
Japanese Official Action dated Feb. 13, 2009 cited in Japanese Application No. 2003-162911.
Japanese Official Action dated Feb. 24, 2009 cited in Japanese Application No. 2003-161338.
Japanese Official Action dated Mar. 6, 2009 cited in Japanese Application No. 2004-042140.
C. Heinemann, "Cross-Reference your XML Data", Microsoft Corporation, Dec. 7, 1998, 6 pgs.
D. Obasanjo, "XML_Namespaces and How They Affect Xpath and XSLT", Microsoft Corporation, May 20, 2002, 19 pgs.
European Communication Summons to Attend Oral Proceedings dated May 7, 2008 cited in European Application No. 04002224.6.
Russian Official Action dated Mar. 13, 2008 cited in Russian Application No. 2004104096/09(004398).
Japanese Official Action dated Mar. 28, 2008 cited in Japanese Application No. 2003-178497.
Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.
European Communication dated Jun. 3, 2008 cited in European Application No. 03 011 851.7-2211.
Japanese Official Action dated Apr. 18, 2008 cited in Japanese Application No. 2003-128417.
Mexican Official Action dated Feb. 11, 2009 cited in Application No. PA/a/2003/005451.
Chinese Final Rejection dated Mar. 13, 2009 cited in Application No. 03145242.6.
Japanese Final Rejection dated Mar. 17, 2009 cited in Application No. 2004-037158.
Japanese Final Rejection dated Apr. 3, 2009 cited in Application No. 2002-207514.
C. Goldfarb, XML Handbook, $1^{st}$ Ed., Pearson Education, Japan, May 10, 1999, pp. 246-254 (no English translation).
S. Tanaka, "Verifying the XML Schema Definition," XML Magazine, Shoeisha Co., Ltd., vol. 10, No. 3, Jul. 1, 2000, pp. 135-155 (no English translation).
Japanese Official Action dated May 26, 2009 cited in Application No. 2005-039754.
Polish Official Action dated Aug. 25, 2009 cited in Application No. P. 365553 (60001.0216PL01).
Australian Second Official Action dated Sep. 11, 2009 cited in Application No. 2003204478 (60001.0190AU01).
Chinese Decision on Rejection dated Jul. 3, 2009 cited in Application No. 03143003.1.
European Summons to Attend Oral Proceedings dated Aug. 5, 2009 cited in Application No. 03003931.7.
Norwegian Official Action dated Aug. 24, 2009 cited in Application No. 2003 2550 (60001.0181no01).
Polish Official Notice dated Sep. 22, 2009 cited in Application No. P. 364854/DP (60001.0211p101).
Polish Official Notice dated Sep. 23, 2009 cited in Application No. P. 360520/DP (60001.0181p101).
Korean Official Action dated Sep. 30, 2009 cited in Application No. 10-2003-40988 (50037.0121ks01).
Japanese Official Notice of Final Rejection dated Oct. 2, 2009 cited in Application No. 2003-162911 (60001.0181jp01).
Russian Official Action dated Jun. 21, 2009 cited in Application No. 2005104223/09(005505) (60001.0266RU01).
D. Richter, "Windows for professionals" (Win32 API programming for Windows NT 3.5 and Windows 95, translation from English, Moscow: Russian Edition, 1995, ISBN 5-7502-0010-8, pp. 26, 31, 215 (60001.0266RU01).
U.S. Final Office Action dated Nov. 30, 2009 cited in Application No. 10/179,810 (60001.0187US01).
Glover et al., "Inferring hierarchical Descriptions," ACM, 2002, pp. 507-514 (60001.0079USI1).
Australian First Official Action Report dated Jan. 18, 2009 cited in Application No. 2004200459 (60001.0211AU01).

* cited by examiner

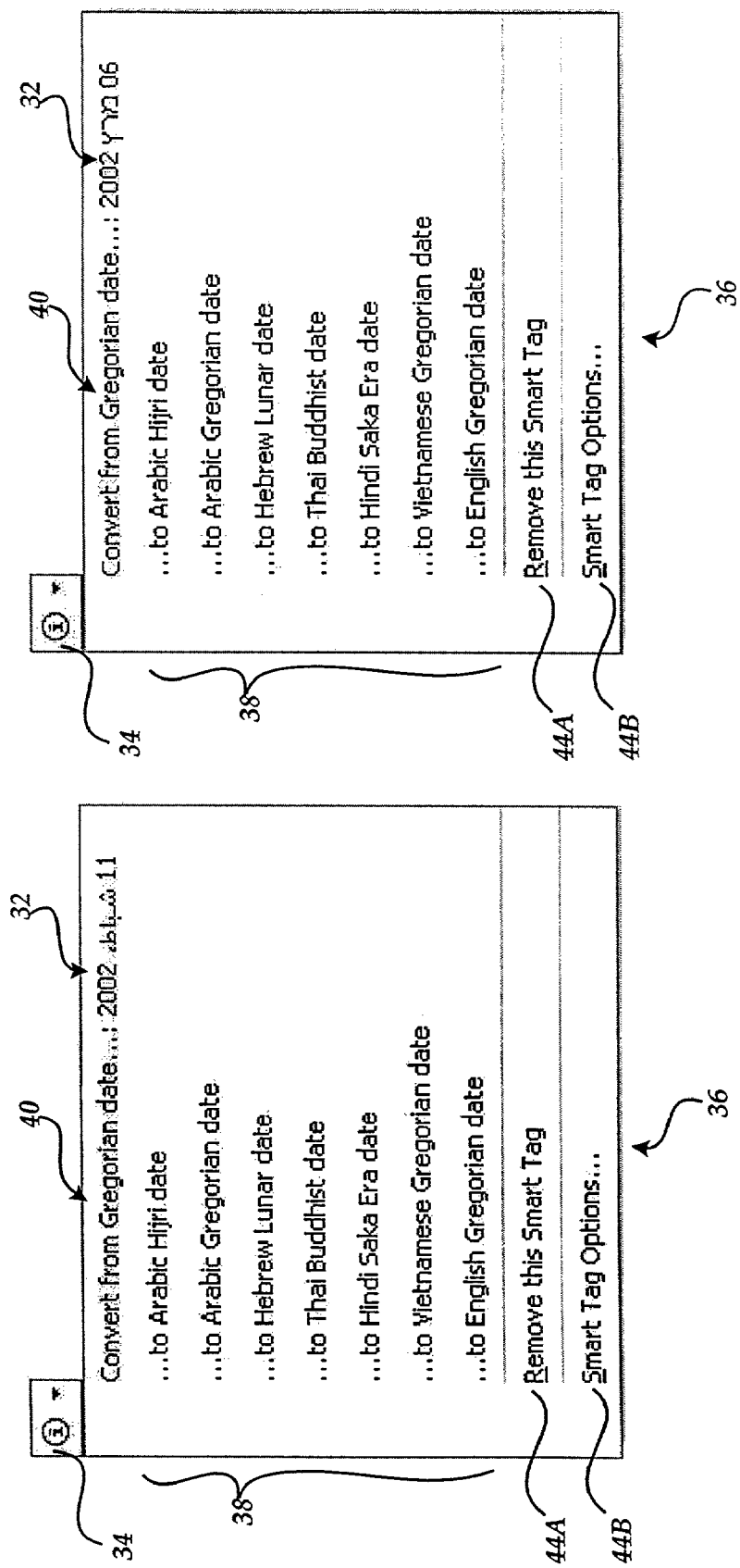

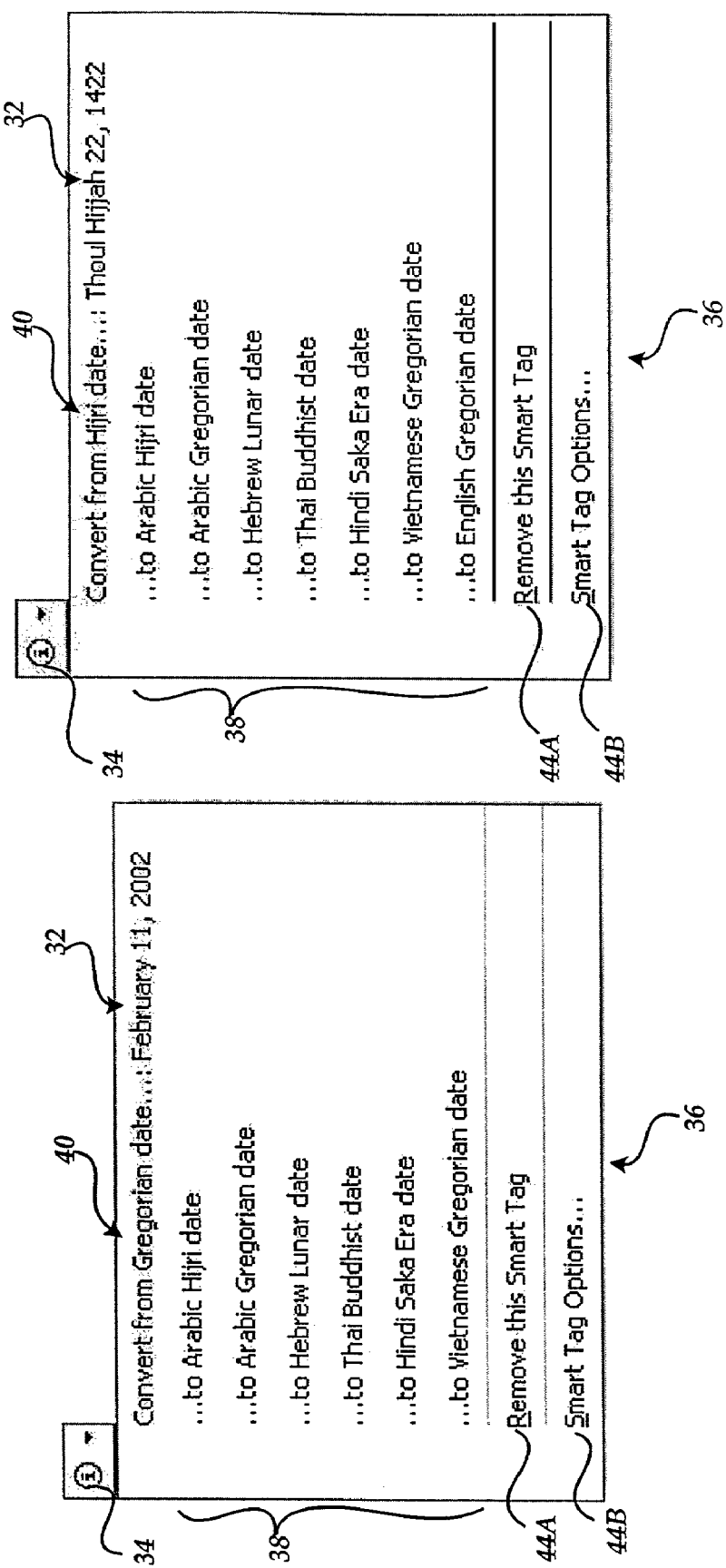

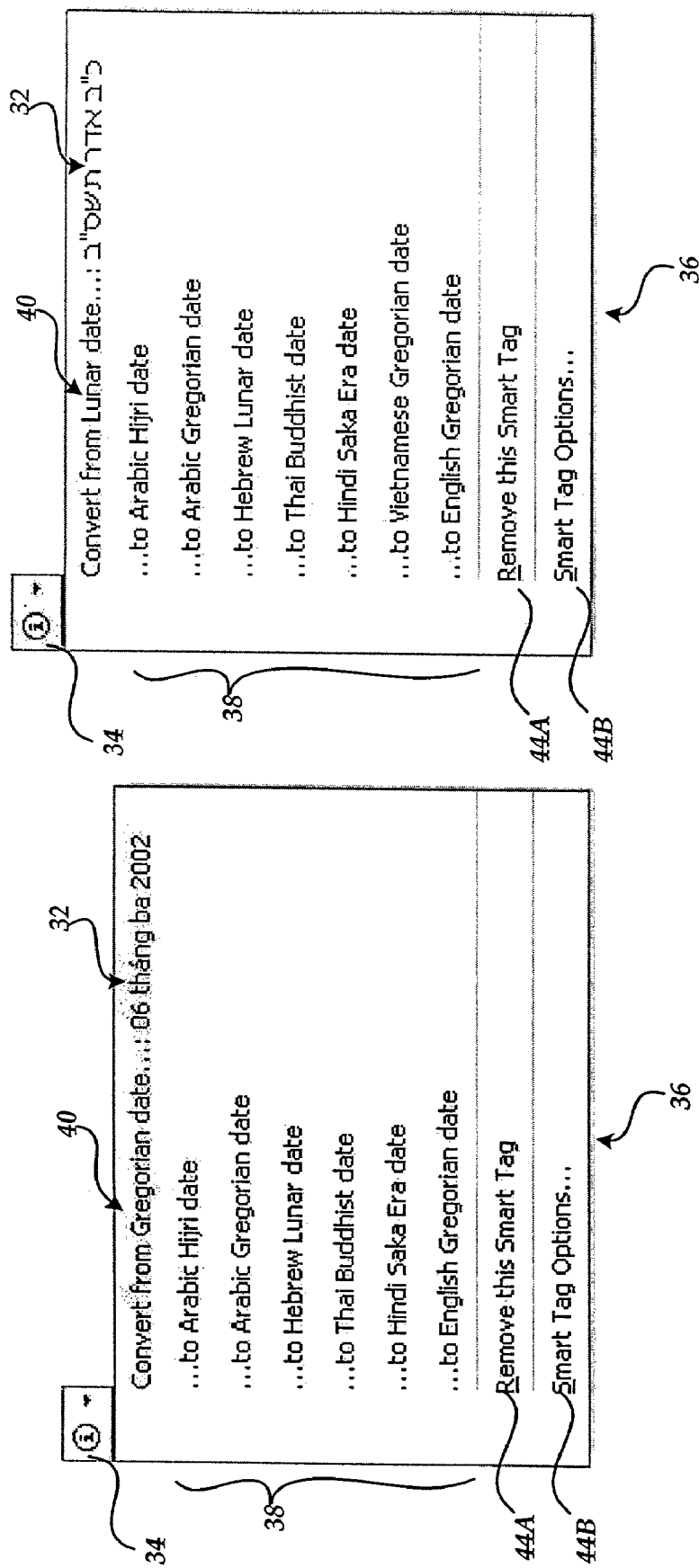

US 7,707,496 B1

METHOD, SYSTEM, AND APPARATUS FOR CONVERTING DATES BETWEEN CALENDARS AND LANGUAGES BASED UPON SEMANTICALLY LABELED STRINGS

TECHNICAL FIELD

Embodiments of the present invention relate to the field of date conversion. More particularly, embodiments of the invention relate to the field of converting dates between languages and calendars based upon semantically labeled strings.

BACKGROUND OF THE INVENTION

Modern desktop operating systems are provided with various localization features for improving usability for users throughout the world. For instance, some desktop operating systems provide support for multiple user interface languages. Through this type of support for multiple user interface languages, users can configure the user interface of the operating system to operate in any of a number languages supported by the host operating system.

In addition to operating system support, many application programs also support the use of multiple languages for international users. For instance, a word processing program may allow a user to create documents in English, Thai, Vietnamese, or any other language installed in the operating system and enabled by the user. Documents may also be created that contain text or other information in a combination of languages. In fact, international users of such applications frequently create documents that include text in more than one language.

When creating foreign language documents, users may express dates in more than one language and possibly in more than one calendar type. For instance, a user may refer to a date expressed in the English language and the Gregorian calendar. Similarly, a user may express a date in the That language and the Buddhist calendar.

When creating electronic documents having dates expressed in different languages and calendar types, users may need to convert dates between languages and calendars. For instance, a user may want to convert the English Gregorian date to a That Buddhist date. However, converting between languages and calendars in this manner has heretofore been difficult for a user to accomplish easily. Previously, if a user wanted to convert a date between calendars and/or languages, the user would have to copy the date to be converted to a clipboard and then paste the date into an external program or World Wide Web ("Web") site capable of converting the date.

Once the external program or Web site had completed the conversion, the user would copy the converted date to the clipboard and then paste the converted date back into their document. Although systems such as these permit a user to convert a date between calendars and/or languages, these systems can be difficult for a user to use because of the large number of steps required to complete the conversion. Moreover, these previous solutions require the user to perform the conversion using the user interface language of the conversion program or Web site. This can be extremely frustrating for a user that does not understand the language of the conversion program or Web site.

Therefore, in light of the above, there is a need for a method, system, and apparatus for easily converting dates between calendars and languages that do not require a user to utilize an external application or Web site to convert dates between calendars and languages. Moreover, there is a need for a method, system, and apparatus for converting dates between calendars and languages that can present conversion options to the user in a user-selected user interface language.

SUMMARY OF THE INVENTION

Embodiments of the present invention solve the above-described problems by providing a method, system, and apparatus for easily converting dates between calendars and languages that do not require the use of an external application or Web site to convert dates. Moreover, embodiments of the present invention provide a method, system, and apparatus for converting dates between calendars and languages that can present conversion options to the user in a user-selected interface language. Moreover, embodiments of the invention only present conversion options to the user for languages for which a host operating system or a host application provides support.

According to one actual embodiment of the present invention, a method is provided for converting a date between calendars and languages in a system for creating and editing an electronic document. According to this embodiment of the invention, software modules are executed in conjunction with a software application for creating and editing an electronic document that allow the convenient conversion of dates between calendars and languages. When a user types a string of text, such as a paragraph, the string is analyzed to determine whether the string of text includes a date. If the string of text includes a date, the date is semantically labeled with schema information that identifies the calendar and language used to express the date. For instance, if a date is expressed using the Gregorian calendar and the English language, schema information will be associated with the string indicating the language and calendar type.

Once a date has been identified within a string of text, such as a paragraph, the application may display an indication to the user that the date has been semantically labeled. This indication also identifies to the user that actions may be performed on the date. When a selection is received of the date or the indication, a list of actions may be provided to the user identifying conversion options available for the date. For instance, if the identified date is expressed in the English language and the Gregorian calendar, an action menu item may be displayed to the user for converting the date into a Hebrew Lunar date. Other types of conversion options may also be presented to the user for converting the date between languages and calendars.

According to one embodiment of the invention, a current user interface language setting for the application program is determined prior to providing the list of actions to the user. When the user selects the list of actions, the available actions are displayed to the user in a language specified by the current user interface language setting. In this manner, the user is always presented the conversion options in the current user interface language.

According to another actual embodiment of the invention, each of the enabled languages for the application program may also be identified prior to displaying the list of actions. Once the enabled languages have been identified, actions may be included in the list of actions only for converting between language and calendar types corresponding to enabled languages. In this manner, a user is never presented with conversion options for converting to languages unsupported by the current configuration of their application program.

After the list of actions has been displayed to the user, a selection of one of the actions may be received. In response to receiving the selection of a conversion action, a converted date may be generated by converting the selected date to the calendar and language identified by the selected action. Once the conversion has been completed, the converted date may be inserted into the string of text to replace the selected date. According to various embodiments of the present invention, a document object model supported by the host application may be utilized to insert the converted date into the string of text.

According to another embodiment of the present invention, a system is provided for converting a date between calendars and languages. According to this embodiment of the invention, the system includes a recognizer plug-in capable of receiving a portion of an electronic document as a string of text from an application program. For instance, the recognizer plug-in may receive a paragraph of text from an application program as it is typed by the user. Once the recognizer plug-in has received the string of text, the recognizer plug-in analyzes the string of text to determine whether the string of text includes a date. If the string of text includes a date, the recognizer plug-in semantically labels the date with schema information identifying the calendar and language used to express the date. This information is then passed by the recognizer plug-in back to the application program.

According to one embodiment of the invention, the system also includes an application program for creating and editing an electronic document. For instance, the application program may comprise a word processor, a spreadsheet application program, an e-mail application which includes editing functions, or other types of application programs for creating and editing electronic documents. According to this embodiment of the invention, the application program is capable of displaying the string of text along with an indication that the date has been semantically labeled by the recognizer plug-in. This indication may comprise a user interface object for indicating to a user that the date has been semantically labeled and that conversion actions may be performed on the date.

The application program may also be operative to receive a selection of the date or the indication and to provide a list of actions that may be performed on the date to convert the date to another language or calendar. The application may then receive the selection of one of the list of actions and provide the selection and the date to an action plug-in.

The system also includes an action plug-in that is capable of generating a converted date by converting the selected date to the calendar or language identified by the selected action from the list of actions. The action plug-in is also operative to replace the selected date with the converted date in the string of text. According to one actual embodiment of the invention, the action plug-in may replace the date with the converted date in the string of text by accessing a document object model provided by the application program.

According to various embodiments of the present invention, the system provided herein may also include an action plug-in that is operative to register with the application program prior to performing any conversion functions. As a part of the registration procedure, the action plug-in may provide the list of actions that may be performed on the date to convert the date to another calendar or language to the application program. Moreover, when creating the list of actions, the action plug-in may determine a current user interface language setting for the application program and generate the action menu items in a language specified by the current user interface language setting. Additionally, the action plug-in may also identify one or more enabled languages for the application program and generate each of the action menu items only for conversion between language and calendar types corresponding to the enabled languages. In this manner, the action plug-in ensures that users will be presented lists of actions in the current user interface language and only for conversions supported by the currently enabled languages of the application program.

Other embodiments of the present invention also provide a computer-controlled apparatus and a computer-readable medium for converting dates between calendars and languages based on semantically labeled strings. These and other details regarding the various embodiments of the invention will become more apparent from the detailed description that follows.

BRIEF DESCRIPTION OF THE DRAWINGS

FIGS. 3A-3I are screen diagrams showing screen displays including an action menu for converting dates between languages and calendars provided by various embodiments of the present invention;

DETAILED DESCRIPTION OF AN ILLUSTRATIVE EMBODIMENT

As described briefly above, embodiments of the present invention provide a method, system, apparatus, and computer-readable medium for converting dates between languages and calendar types. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
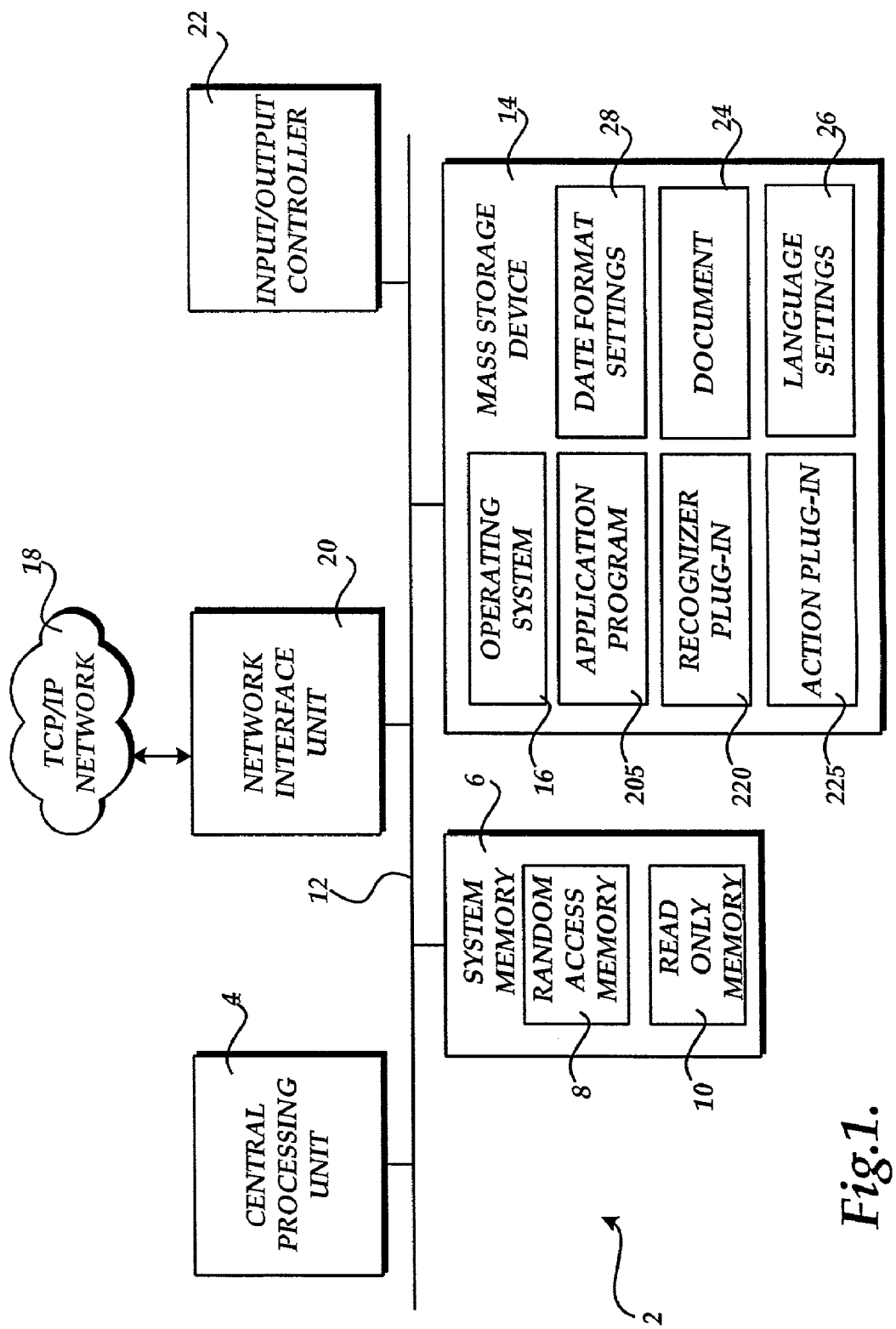
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules. Additional aspects of an illustrative operating environment and software architecture for implementing the various embodiments of the present invention are described in U.S. patent application Ser. No. 09/588,411, entitled "Method and System for Semantically Labeling Strings and Providing Actions Based on Semantically Labeled Strings", which is expressly incorporated herein by reference.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store an application program 205 for creating and editing an electronic document 24. For instance, the application program 205 may comprise a word processing application program and the electronic document 24 may comprise a word processing document. The application program 205 may also comprise a spreadsheet application program and the electronic document 24 comprise a spreadsheet. Similarly, the application program 205 may comprise an electronic mail application program and the electronic document 24 may comprise an electronic mail message. Application programs for creating and editing other types of electronic documents may also be used with the various embodiments of the present invention.

Embodiments of the present invention provide program modules for use in conjunction with the application program 205 that convert dates contained within the electronic document 24 between calendar types and languages. In particular, embodiments of the invention provide a recognizer plug-in 220 and an action plug-in 225. As will be described in greater detail below, the recognizer plug-in 220 recognizes dates in an electronic document 24 and labels the dates with semantic information identifying the language and calendar that the dates are expressed in. The recognizer plug-in 220 then passes this information to the application program 205 for use by the action plug-in 225. The action plug-in 225 performs actions on the recognized dates for converting between calendars and languages.

According to various embodiments of the present invention, the action plug-in 225 may also generate a list of actions that may be performed on a given date. As a part of this process, the action plug-in 225 may query language settings 26 of the application program 205 or operating system 16. The language settings 26 specify the current user interface language and the currently installed and enabled languages for the application program 205 and the operating system 16. The list of actions may then be customized based on the current user interface language and the installed languages. Additionally, the action plug-in 225 may also query the date format settings 28 for the operating system 16 and use the date format settings 28 to format converted dates. The date format settings 28 are specified by the user and define the format in which dates should be displayed by default. For instance, a user may specify that dates be expressed using numbers only, such as "04/02/02", or using names and numbers, such as "Apr. 2, 2002." Other possible formats may also be specified. Additional details regarding the operation of the recognizer plug-in 220 and the action plug-in 225, including the use of the language settings 25 and the date format settings 28, will be described in greater detail below.

Figure 2:
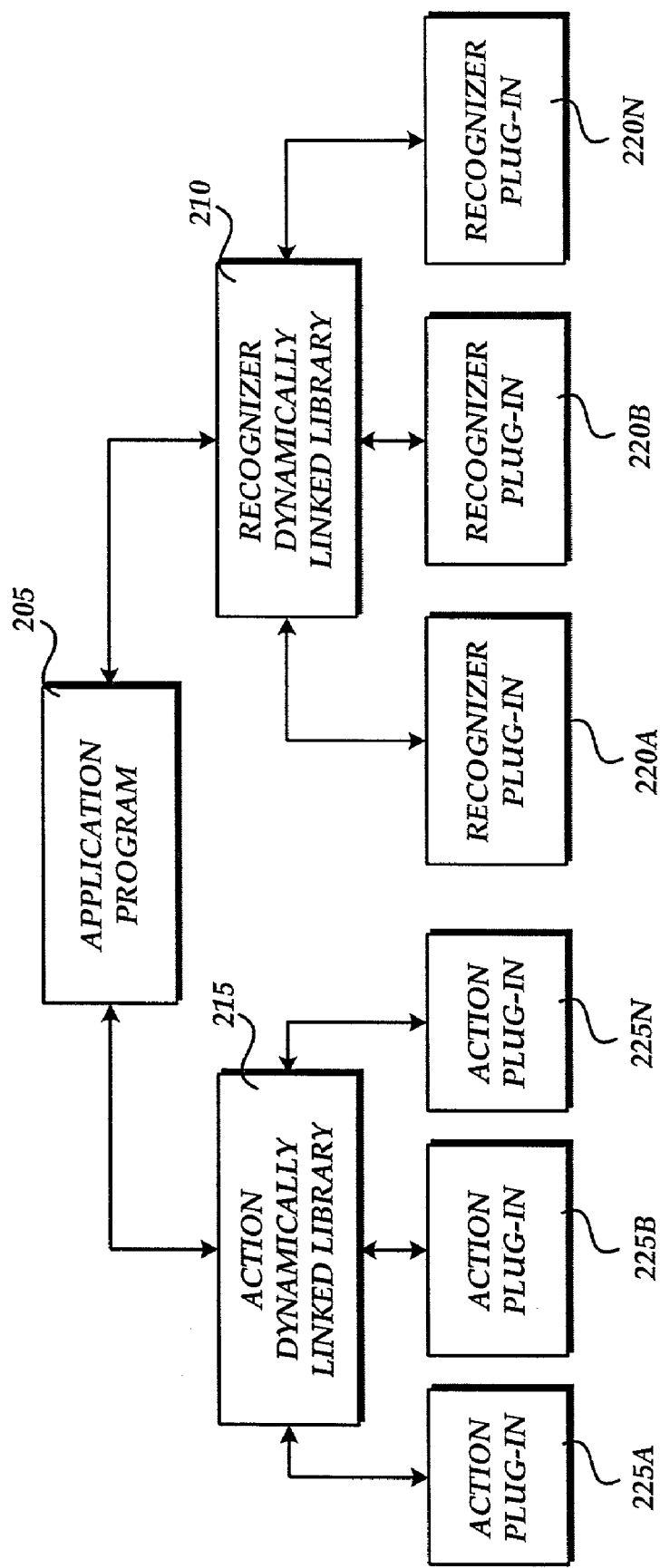
FIG. 2 is a block diagram that shows a software architecture for recognizing, labeling, and performing actions on arbitrary strings of text according to various embodiments of the present invention.

Referring now to FIG. 2, an exemplary software architecture for use in conjunction with the various embodiments of the present invention will be described. The architecture shown in FIG. 2 includes an application program 205, such as a word processor application program, a spreadsheet application program, or other type of application program for creating and editing electronic documents. The application program 205 may also comprise a Web browser.

The application program 205 is able to communicate with a recognizer dynamically linked library ("DLL") 210 and an action DLL 215. As will be described in greater detail below, the recognizer DLL 210 controls one or more recognizer plug-ins 220A-220N and the action DLL 215 controls one or more action plug-ins 225A-225N.

According to one embodiment of the invention, the recognizer plug-ins 220A-220N and the action plug-ins 225A-225N are automation servers. Automation servers are well-known software components that are assembled into programs or add functionality to existing programs running on the WINDOWS XP operating system from MICROSOFT CORPORATION of Redmond, Wash. Automation servers may be written in a variety of computing languages and can be plugged or unplugged from a program at runtime without having to recompile the program.

The recognizer DLL 210 handles the distribution of text strings from an electronic document being edited by the application program 205 to the individual recognizer plug-ins 220A-220N. The recognizer plug-ins 220A-220N recognize particular strings in an electronic document, such as a word processing document or a spreadsheet document. The recognizer plug-ins 220A-220N may be packaged with the application program module 205 or they may be written by third parties to recognize particular strings of interest. Typically, the recognizer DLL 210 passes strings to the recognizer plug-ins 220A-220N in single paragraphs or cell value increments. However, strings may be passed to the recognizer plug-ins 220A-220N in other sizes and formats.

As part of recognizing certain strings as including semantic information, the recognizer plug-ins 220A-220N determine which strings are to be labeled and how they are to be labeled. After receiving these results from the various recognizer plug-ins 220, the recognizer DLL 210 sends semantic categories to the application program module 205. According to one actual embodiment of the invention, a recognizer plug-in 220 is provided for recognizing strings as containing dates. According to this embodiment of the invention, the semantic category comprises schema information that identifies the calendar and language used to express the date. This information is returned to the recognizer DLL 210 by the recognizer plug-in 220 along with other information that may be utilized by a corresponding action plug-in 225, such as a copy of the date, and parameters describing the various parts of the date such as the month, year, date, calendar type, day of week, and language that the month name is express in. Additionally, the recognizer plug-in 220 may return information identifying the location of the date within the text string, including the length of the text string and the character number of the first letter of the date. It should be appreciated that each of the recognizer plug-ins 220A-220N are executed separately. The recognizer DLL 210 is responsible for handling the asynchronicity that results from different recognizer plug-ins 220A-220N returning results at different times. In this manner, various types of data may be recognized within a text string and different actions provided for each semantically labeled string. Additional details regarding the operation of the recognizer plug-in 220 for recognizing dates will be described below with reference to FIGS. 3-8.

Semantic categories are stored as part of the electronic document along with other document information and are available when a document is transmitted from one computer to another computer. According to one embodiment, storing semantic categories in an electronic document is controlled by an "Embed semantic categories" checkbox. The checkbox is on by default. Turning it off will prevent semantic categories in the document from being saved. The state of the checkbox is per document. The same checkbox controls saving for both .htm and .doc documents. Checking a "Save semantic categories as eXtensible Markup Language (XML) properties" checkbox (off by default) will write out the text of all of the semantic categories in the document and their labels in the header of the Hypertext Markup Language (HTML) file in XML (that is using the same tags as are used inline, but surrounded by <xml> And </xml>) for easy identification and parsing by search engines and knowledge management systems.

After a string is labeled by a recognizer plug-in 220A-220N, schema information is sent to the application program module 205. A user of the application program module 205 may then execute actions that are associated with the schema information on the recognized string. The action DLL 215 manages the action plug-ins 225A-225N that are executed in order to perform the actions. As with the recognizer plug-ins 220A-22N, the action plug-ins 225A-225N may be packaged with the application program module 205 or written by third parties to perform particular actions that are of interest. The action plug-ins 225A-225N provide possible actions to be presented to the user based upon the schema information, or type label, associated with the string. As will be described in greater detail below, the list of actions provided to the user is dynamically generated for each schema type. This information is then provided to the application program 205 which displays the list of actions to the user when the string is selected.

After an action has been chosen from the list of actions, the action DLL 215 manages the appropriate action plug-in 225A-225N and passes the necessary information between the action plug-in and the application program module 205 so that the action plug-in may execute the desired action. Typically, the application program module 205 sends the action DLL 215 an automation request to invoke the action the user has selected. As will be described in greater detail below, according to one embodiment of the invention, an action plug-in 225 is provided that converts recognized dates between various calendars and languages. Addition details regarding the operation of the action plug-in 225 and the schema information utilized to identify different calendar and language types will be described in greater detail below with reference to FIGS. 3-8.

Figure 3A:
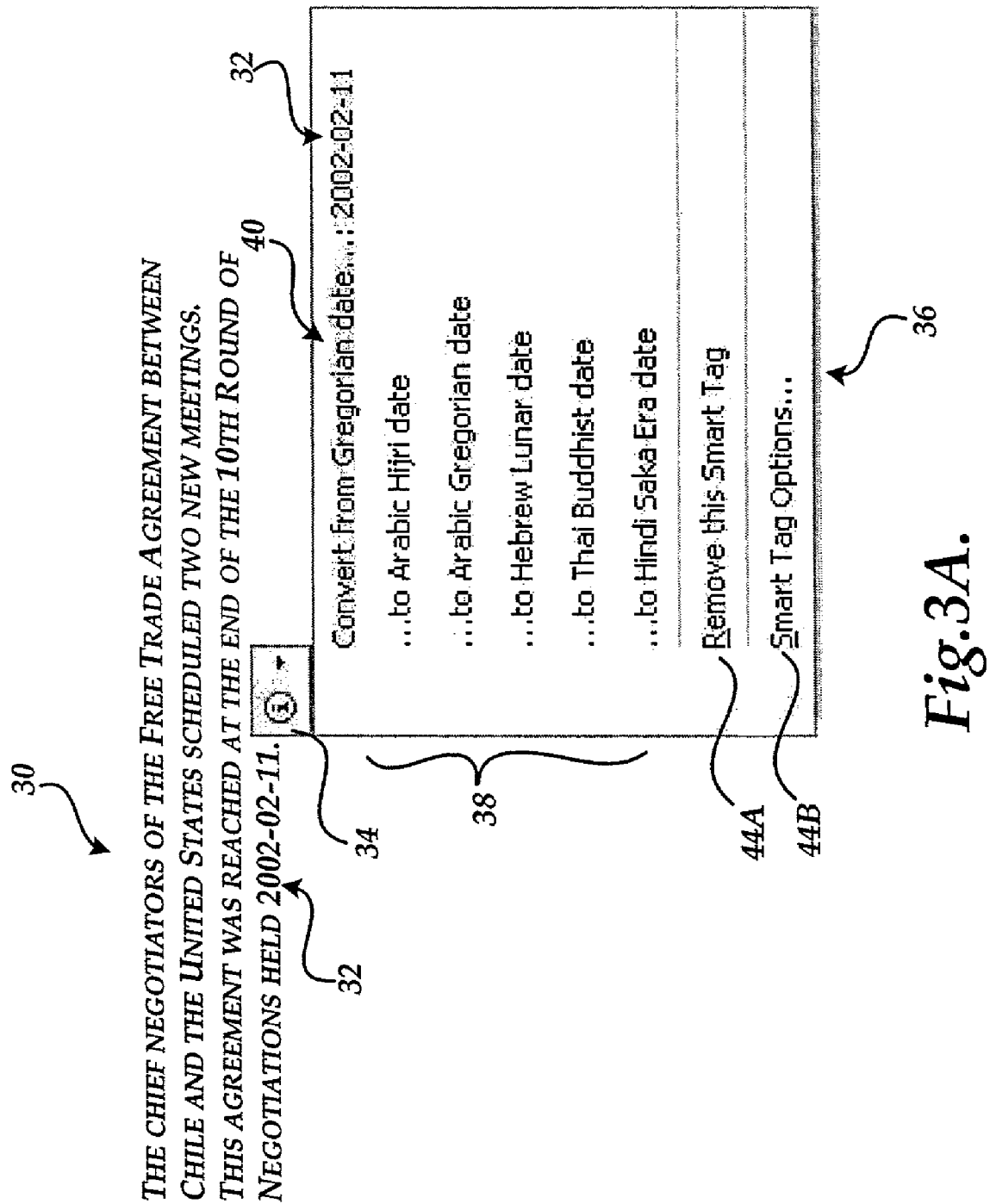

Referring now to FIGS. 3A-3I, an illustrative user interface provided by the various embodiments of the present invention will be described. As shown in FIG. 3A, a string of text 30 may be typed by a user into an application program module, such as a word processor. Once the user has provided the string of text 30, the string of text is provided to a recognizer plug-in 220 that recognizes dates contained within the string of text 30. The date 32 identified by the recognizer plug-in 220 is identified to the application program module as a type of semantic information upon which actions may be performed. Therefore, the application program module 205 provides an indication to the user that actions may be performed on the date 32. This indication may be provided to the user by highlighting the date 32 or providing a user interface indication 34 in proximity to the date 32.

When the date 32 or the indication 34 is selected by a user, a list of actions is displayed that may be performed on the date to convert the date to another language or calendar. This list of actions may comprise a dropdown menu 36 having one or more menu items corresponding to the list of actions that may be performed on the date. According to one embodiment of the invention, the contents of the dropdown menu may be displayed in one of many different languages. The language in which the dropdown menu 36 is displayed is based on a current user interface language for the application program module 205 or the operating system 16. In this manner, international users throughout the world will be displayed a dropdown menu 36 in their currently installed and active user interface language.

As shown in FIG. 3A, the dropdown menu 36 includes text 40 describing the type of conversion that may take place on the date 32. The dropdown menu 36 also includes another indication of the date 32 to be converted. The dropdown menu 36 also includes a list of actions 38 that may be performed to convert the date 32. According to one embodiment of the invention, the list of actions 38 displayed in the dropdown menu 36 is limited to conversion options between language and calendar types corresponding to languages enabled in the application program 205. In this manner, actions for converting dates between languages, or sets of languages, not supported by the application program 205 will not be shown in the dropdown menu 36. For example, an action item for converting into a Hebrew Lunar date would not appear on the dropdown menu 36 if support for the Hebrew language is not enabled in the application program 205.

As shown in FIG. 3A, the application program module 205 also adds menu items 44A and 44B to the dropdown menu 36. The selection of item 44A removes capabilities for converting between dates and calendars from the personal computer 2 and the selection of item 44B provides a list of user selectable preferences defining the operation and behavior of the recognizer and action plug-ins.

As described briefly above, when a date 32 is recognized by the recognizer plug-in 220, the date 32 is labeled with schema information identifying the calendar and language used to express the date 32. Schema information is then returned to the application program module 205 and is utilized by the action plug-in 225 to determine the appropriate list of actions 38 that should be included in the dropdown menu 36. In this manner, only conversion operations consistent with the type of calendar and language used to express the date 32 are provided to the user via the dropdown menu 36.

The date 32 shown in FIG. 3A is a Gregorian date that expresses the month using a number rather than a name. The schema name "urn:schemas-microsoft-com:office:cs:smarttags#date1" is used when, as shown in FIG. 3A, a Gregorian date string uses a number rather than a name to express the month. The dropdown menu 36 shown in FIG. 3A is the display provided to user when the English language is the currently enabled user interface language and where the list of enabled languages in the application program 205 includes Arabic, English, Hebrew, Hindi, That, and Vietnamese. It should be appreciated, however, that the dropdown menu 36 would appear, differently if another language was selected as the current user interface language and if other user interface languages were enabled in the application program 205.

As will be discussed in greater detail below, the application program 205 receives most of the text shown in the dropdown menu 36 from the action plug-in 225. This process occurs when the application program 205 is initially executed and the action plug-in 225 registers itself with the application program 205. Additional details regarding this registration process will be described below with reference to FIG. 4.

The recognizer plug-in 220 is also capable of recognizing dates expressed in different languages and utilizing different digit shapes. For instance, as shown in FIG. 3B, the recognizer plug-in 220 may recognize a date 32 expressed in the Gregorian calendar and using an Arabic language name for the month. The schema name "urn:schemas-microsoft-com:office:cs:smarttags#date1ar" is utilized to identify a Gregorian date string using an Arabic language name for the month. As shown in FIG. 3C, the recognizer plug-in 220 may also recognize a Gregorian date string using a Hebrew language name for the month, as illustrated by the date 32. The schema name "urn:schemas-microsoft-com:office:cs:smarttags#date1he" is utilized to represent this type of date.

As shown in FIG. 3D, the recognizer plug-in 220 may also recognize Gregorian date strings utilizing an English language name for the month, as shown by the date 32. This schema name "urn:schemas-microsoftcom:office:cs:smarttags#date1en" is utilized to semantically label such a date. Similarly, as shown in FIG. 3E, the recognizer plug-in 220 may also recognize a Hijri date string using an English transliterated name for the month. For instance, the date 32 shown in FIG. 3E is such a date. The schema name "urn:schemas-microsoft-com:office:cs:smarttags#date1hijrien" is utilized to identify such a date.

FIG. 3F shows a dropdown menu 36 provided when the recognizer plug-in 220 has recognized a Gregorian date string using a Vietnamese language for the month, such as the date 32 shown in FIG. 3F. The schema name to utilized to represent such a date is "urn:schemas-microsoft-com:office:cs:smarttags#date1vi".

The recognizer plug 220 may also recognize dates expressed in the Hebrew Lunar calendar. As known to those skilled in the art, the length of a Hebrew Lunar month is more closely associated with the lunar cycle than a Gregorian month is, but does not have as tight an association with the moon as the Hijri calendar uses. The first day of the Hebrew Lunar year is tied to a certain season, but varies by a few weeks within the solar year. A thirteenth-month is also added at intervals in order to keep the season and months together in the Hebrew Lunar calendar. The numbers in a Hebrew Lunar date, including the year, are usually written not with digits, but instead with Hebrew letters. The recognizer plug-in 220 is capable of recognizing such letters. The dropdown menu 36 displayed when a Hebrew Lunar date 32 is recognized is shown in FIG. 3G.

As known to those skilled in the art, the Hijri calendar is also different from the Gregorian calendar. Hijri months are tied to the cycle of the moon and a number of days in a Hijri year is different from the Gregorian calendar. The recognizer plug-in 220 is also capable of converting dates between the Hijri calendar and other calendars. As shown in FIG. 3H, a Hijri date 32 may be expressed using the Arabic language. In this situation, the schema name "urn:schemas-microsoft-com:office:cs:smarttags#date1hijriar" is utilized.

Figure 3I:
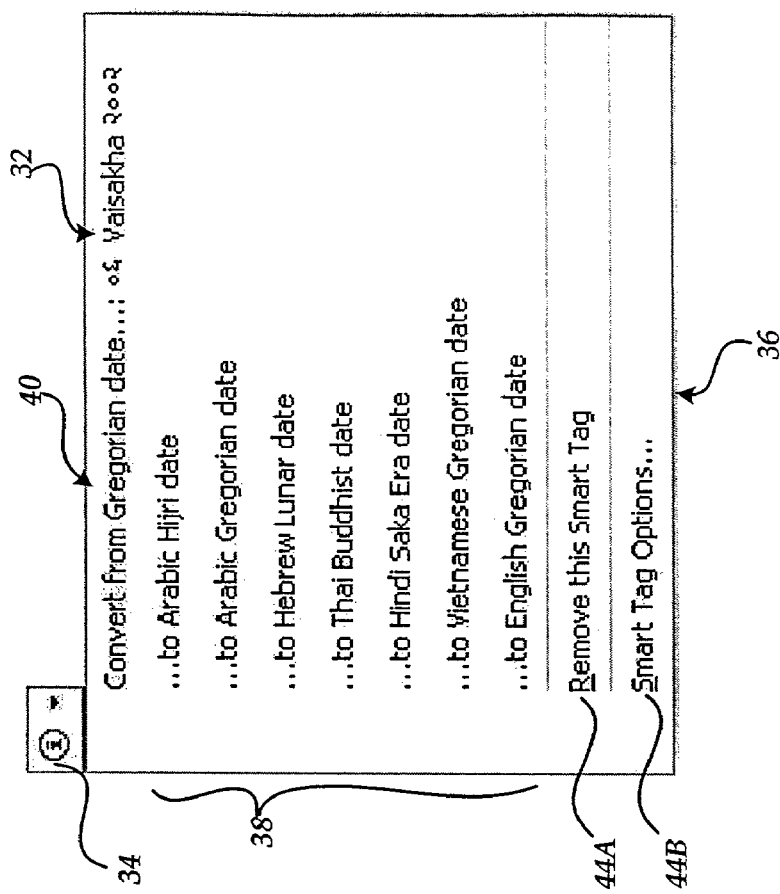
Figure 3H:
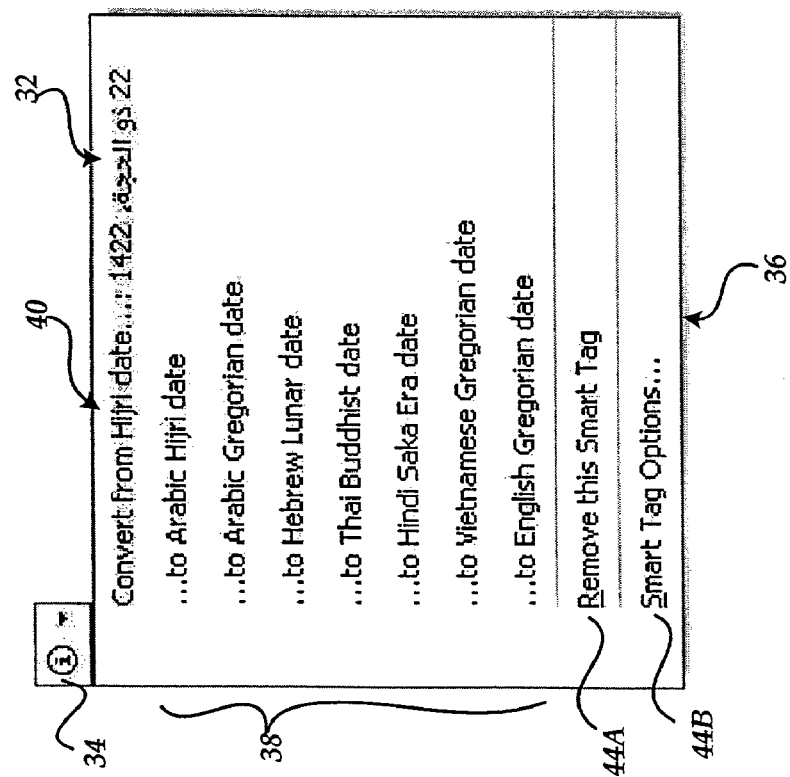

The schema name "urn:schemas-microsoft-com:office:cs:smarttags#date1hi" is utilized when a recognized Gregorian date string uses a Hindi language name for the month, such as the date 32 shown in FIG. 3I. It should be appreciated that numbers in the Hindi language often use the Devanagari digit shapes. The recognizer plug-in 220 is able to recognize these and other common digit shapes utilized to represent dates.

Although embodiments of the invention have been described as capable of recognizing dates in the Gregorian, Hijri, and Lunar calendars and the Arabic, English, Hebrew, Hindi, Thai, and Vietnamese languages, other calendars and languages may also be recognized and converted similarly.

Figure 4:
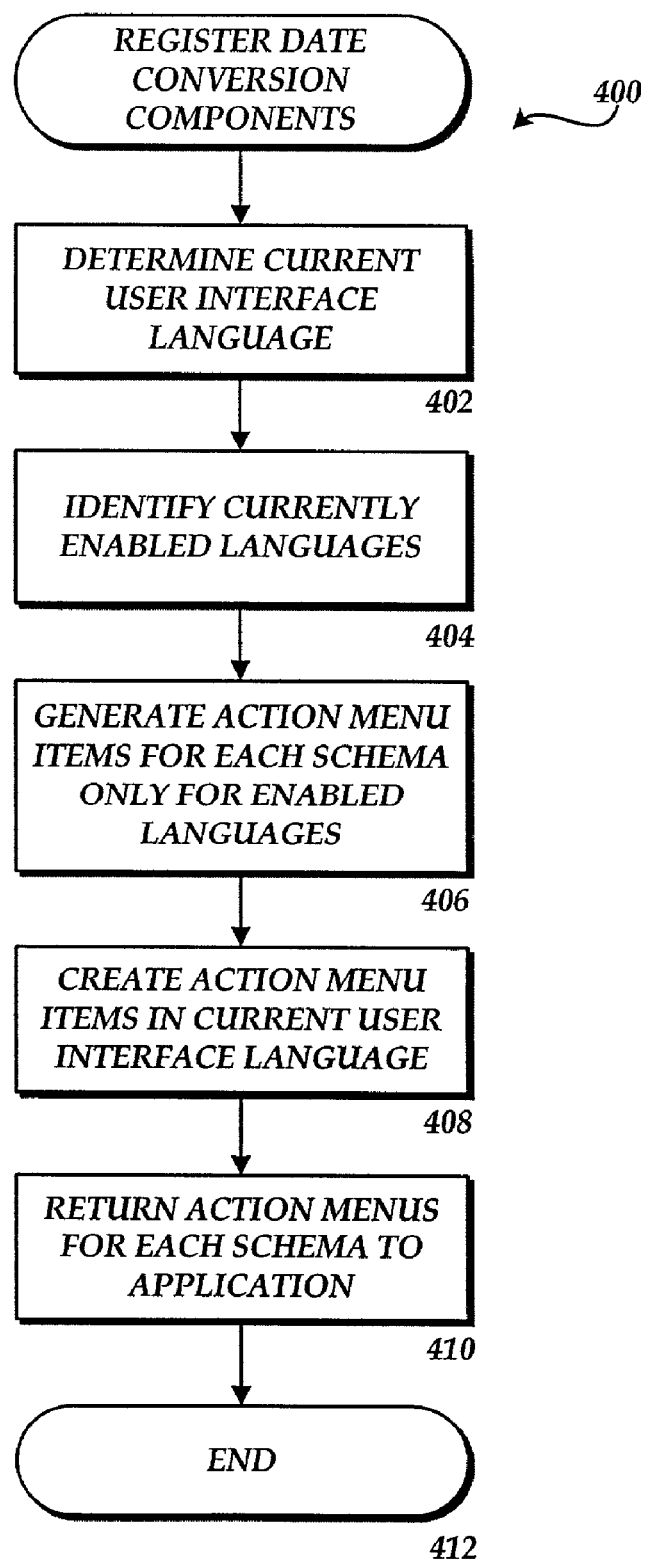
FIG. 4 is a flow diagram showing an illustrative routine for registering an action plug-in with an application program according to one actual embodiment of the present invention.

Referring now to FIG. 4, an illustrative routine 400 will be described for registering the date conversion software components with the application program 205. In particular, when the action plug-in 225 and the recognizer plug-in 220 for converting between languages and dates are first executed, they are registered with the application program 205. By registering with the application program 205, the application program 205 is made aware of the software components and enabled for use with the schema types recognized by the recognizer plug-in 220. Moreover, the action items to be displayed to the user corresponding to each schema type are also enumerated to the application program 205 so that the application program 205 can display the dropdown menu 36 when a date 32 or indicator 34 is selected by a user.

The routine 400 begins at block 402, where the current user interface language is identified. As discussed briefly above, the current user interface language may be stored in the language settings 26 maintained by the operating system 16 or the application program 205. Once the current user interface language has been identified, the routine 400 continues to block 404. At block 404, the currently enabled languages are also identified. In particular, the language settings 26 may again be consulted to determine the languages that are enabled and installed for use with the operating system 16 or with the application program 205.

Once the currently enabled languages have been identified, the routine 400 continues to block 406, where action menu items are generated for each schema type for the enabled languages. In this manner, action items are generated for each schema type and for the currently enabled languages. No action items are generated for conversion options corresponding to languages that are not installed or enabled.

From block 406, the routine 400 continues to block 408, where the action menu items are created in the current user interface language. In this manner, the dropdown menu 36 displayed to the user is provided in the current user interface language. From block 408, the routine continues to block 410, where the action menus for each schema are returned to the application program 205. According to one embodiment of the invention, the application program 205 displays the dropdown menu 36 in response to the selection of a date 32 or an indicator 34. However, it should be appreciated that the action plug-in 225 or other software component may be responsible for the display of the dropdown menu 36. The routine 400 continues from block 410 to block 412, where it ends.

Figure 5:
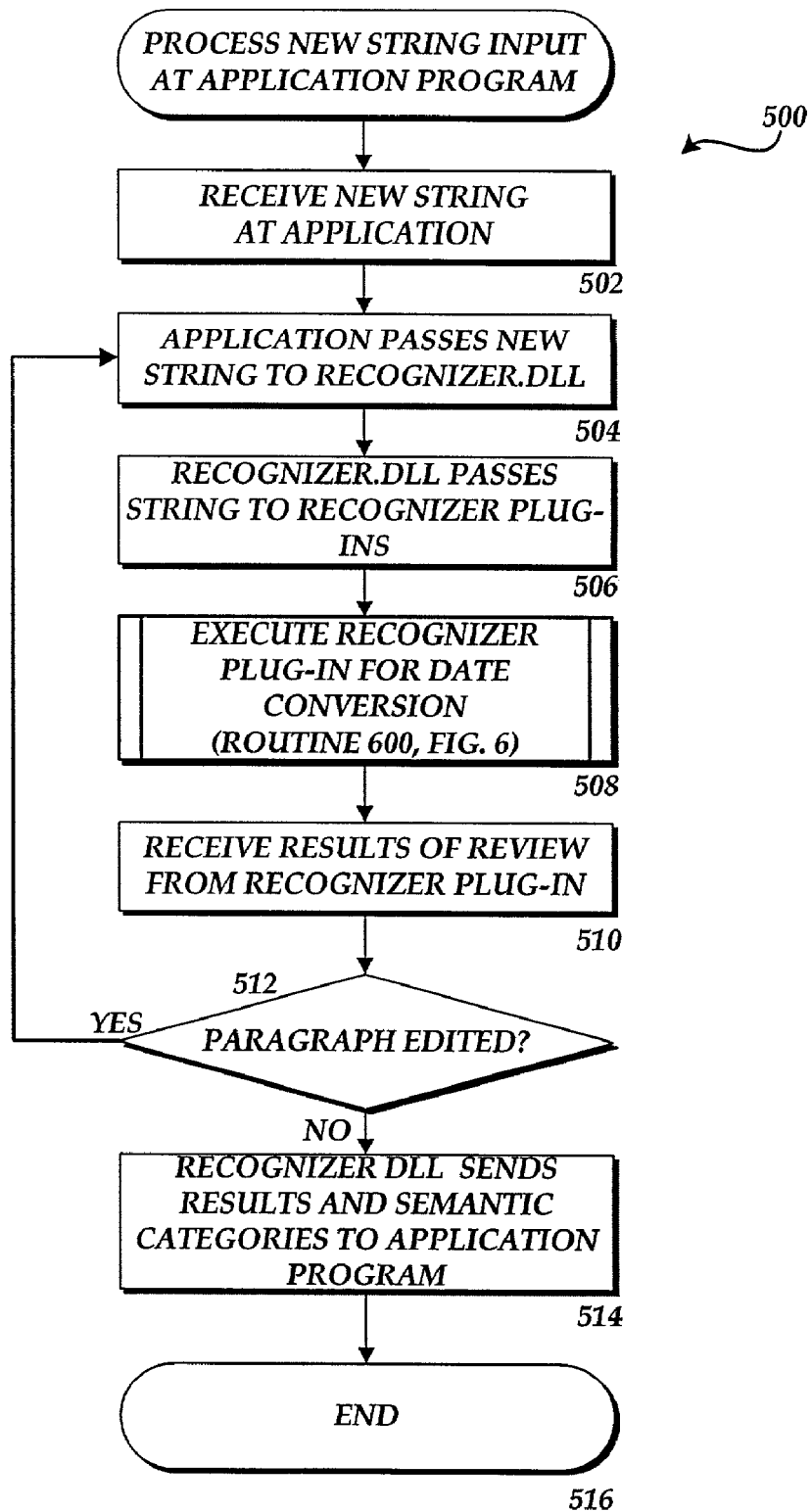
FIG. 5 is a flow diagram showing an illustrative routine for processing a string input provided at an application program according to one actual embodiment of the present invention.

Turning now to FIG. 5, an illustrative routine 500 will be described for processing the input of a new string at the application program 205. The routine 500 begins at block 502, where the application program 205 receives a new string, such as when a user enters a new paragraph into an electronic document or edits a previously entered paragraph. From block 502, the routine 500 continues to block 504 where the application program 205 passes the new string to the recognizer DLL 210. As described above, the recognizer DLL 210 is responsible for communicating with the application program 205, managing the jobs that need to be performed by the recognizer plug-ins 220A-220N, receiving results from the recognizer plug-ins 220A-220N, and sending schema information to the application program module 205 for recognized dates. It should be understood that, in one embodiment of the invention, a paragraph is passed to the recognizer DLL 210 at block 504. However, in alternative embodiments, a sentence, the contents of a spreadsheet cell, a section of the document, the entire document, etc., may be passed to the recognizer DLL 210. In other words, it should be appreciated that the embodiments of the present invention are not limited to simply passing a paragraph to the recognizer DLL 210.

From block 504, the routine 500 continues to block 506, where the recognizer DLL 210 passes the string to the recognizer plug-ins 220A-220N. The routine 500 then continues to block 508 where the recognizer plug-ins are executed on the paragraph to recognize key words within the string. In particular, the recognizer plug-in for converting dates is executed on the string. An illustrative routine describing the operation of the recognizer plug-in for date conversion is described below with reference to FIG. 6.

At block 510, the results from the recognizer plug-in 220 are received at the recognizer DLL 210. The routine 500 then continues to block 512, where a determination is made by the recognizer DLL 210 as to whether the paragraph has been edited since the string was transmitted to the recognizer plug-ins 220A-220N. If the paragraph has been edited, the routine 500 returns to block 504, where the edited string is passed to the recognizer DLL 210. If the paragraph has not been edited, the routine 500 continues to block 514, where the recognizer DLL 210 sends the results received from the recognizer plug-in 220 to the application program 205. The routine 500 then continues to block 516, where it ends.

Figure 6A:
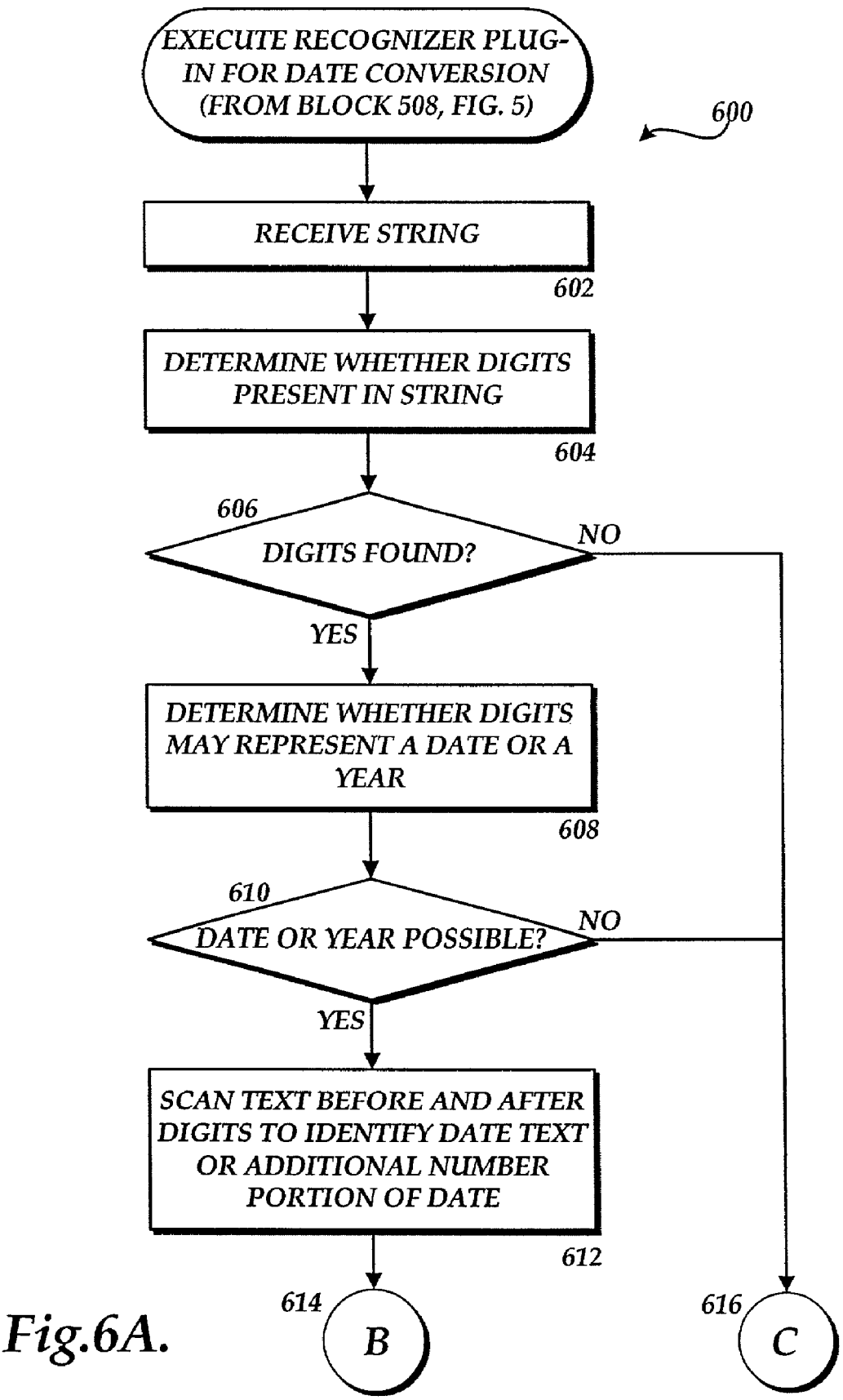
FIGS. 6A-6B are flow diagrams illustrating the operation of a recognizer plug-in software module provided according to one actual embodiment of the present invention.
Figure 6B:
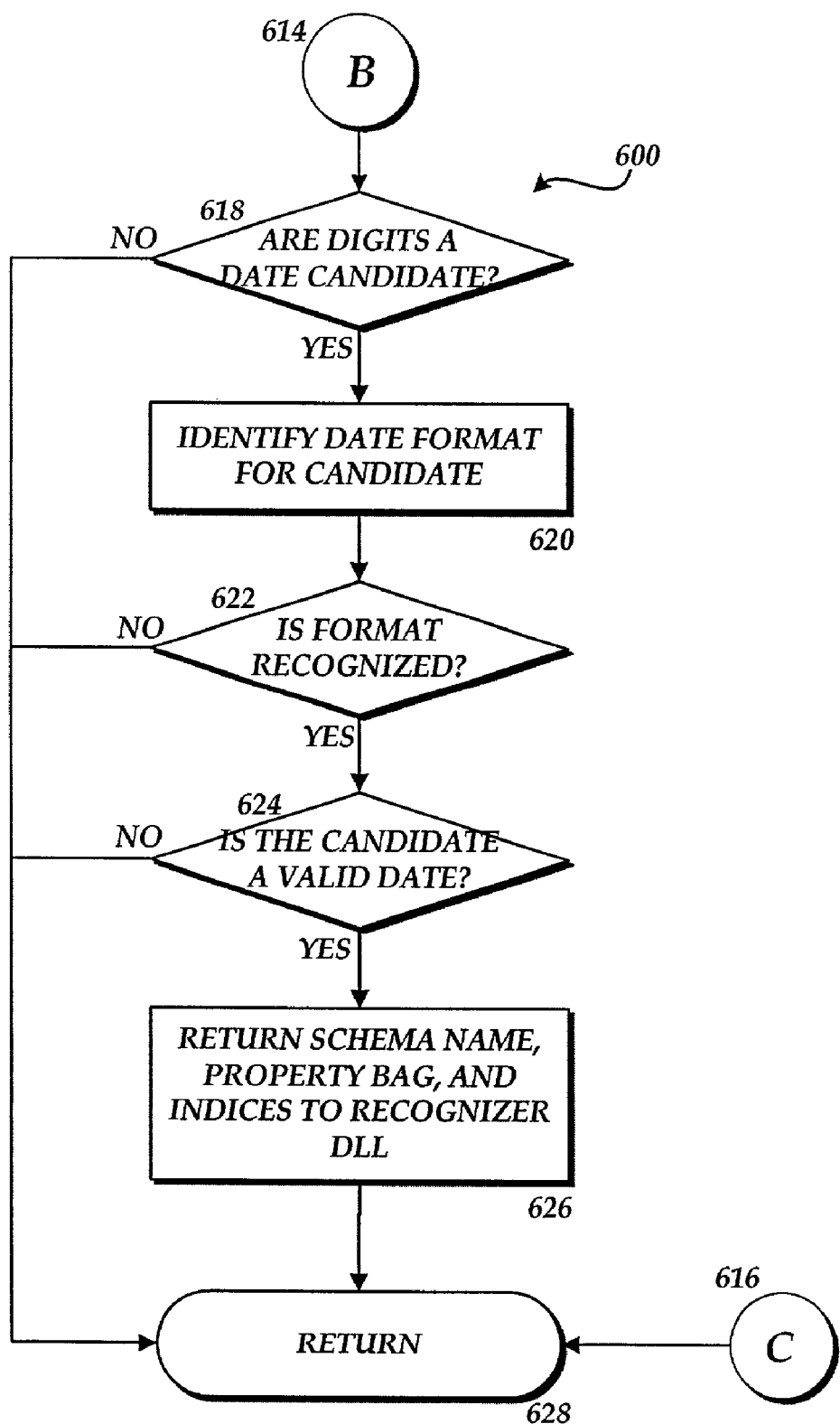

Referring now to FIGS. 6A and 6B, an illustrative routine 600 will be described that illustrates the operation of the recognizer plug-in 220 for converting between calendars and languages according to one embodiment of the present invention. The routine 600 begins at block 602, where a string of text is received at the recognizer plug-in 220 from the recognizer DLL 210. The routine 600 then continues to block 604, where a determination is made as to whether the string of text contains digit characters. As described above, the digit characters may be identified regardless of the language in which the characters are represented.

From block 604, the routine 600 continues to block 606, where a determination is made as to whether digits were found in the string of text. If no digits were found, the routine 600 branches from block 606 to block 628, where it returns to block 510, shown in FIG. 5. If, however, at block 606, it is determined that digits were found in the string of text, the routine 600 continues to block 608.

At block 608, a determination is made as to whether the identified digits in the string of text may represent a year or a day of week. For example, extremely large numbers or extremely low numbers may be ruled out as possible candidates to represent a year. Similarly, extremely large numbers may also be ruled out as being candidates to represent a day. These determinations may be made on a per calendar basis. Other types of determinations may also be made for determining whether the digits may possibly represent a day or a year.

From block 608 the routine 600 continues to block 610 where a determination is made as to whether the digits located in the string of text may possibly represent a day or year. If the digits may not represent a day or year, the routine 610 branches to block 628, where it returns to block 510, shown in FIG. 5. If the identified date in the string of text may comprise a day or year, the routine 600 continues to block 612.

At block 612, text located before and after the located digits is scanned to identify additional text portions of the date or additional number portions of the date. For instance, if the digits located within the string of text comprise a year, the text before the number may be scanned to locate the date portion and, for instance, a month portion. Similarly, if the digits located are the date portion, the text after the date may be scanned to locate the year portion of the date. In this manner, the string of text representing the entire date, such as "Friday, Feb. 28, 1992," may be identified.

According to one embodiment of the invention, text prior to and after the digits located in the string of text may be searched only for dates expressed in languages currently supported by the personal computer 2. To perform this function, a list of month names and day names may be consulted for each language to identify text corresponding to dates expressed in the installed languages. In this manner, processing time is not expended on identifying dates that are expressed in languages not supported by the personal computer 2.

From block 612, the routine 600 continues to block 618, where a determination is made as to whether the portion of the string of text identified, including text before and after the digits, is a date candidate. A date candidate is an all numeric date expressed in a certain format, or date and year digits expressed along with words indicating that the digits represent a date, such as a month name, or a day name. If the digits and the surrounding text are not a date candidate, the routine 600 branches to block 628, where it returns to block 510 shown in FIG. 5. If, however, the digits and the surrounding text are a date candidate, the routine 600 continues to block 620.

At block 620, the date format for the candidate date is identified. For instance, the separator characters used to separate a date and a year may be identified to properly locate the digits used to express the day, month and year. According to one embodiment of the invention, a preferred date format as specified by the user in the date format settings 28 may be utilized to determined the correct date format for the date candidate.

From block 620, the routine 600 continues to block 622 where a determination is made as to whether the identified date format is recognized. If the date format is not a recognized date format, the routine 600 branches to block 628, where it returns to block 510, shown in FIG. 5. If the date format is recognized, the routine 600 continues to block 624 where a determination is made as to whether the date candidate is a valid date. This may include determining whether the date is a valid date expressed in one of the several calendar types. If the candidate is not a valid date, the routine 600 branches from block 624 to block 628, where it returns. If, however, the candidate is a valid date, the routine 600 continues to block 626.

At block 626, the schema name associated with the language and calendar type used to express the date is returned to the recognizer DLL 210. Additionally, a "property bag" is also returned to the recognizer DLL 210. The property bag is an object which stores information about the recognized date that may be utilized by the action plug-in 225. In particular, the property bag includes properties that identify the year, month number, and day of month for the recognized date. The property bag may also include a format number indicating generally which format the recognized date was written in. This number is utilized according to one embodiment of the invention so that the format for a converted date may be matched to the format of the recognized date. For example, if the weekday name was in the recognized date, then the action plug-in 225 would attempt to include the equivalent weekday name in the converted date.

A calendar type number may also be utilized in the property bag to distinguish Gregorian, Hijri, and Hebrew Lunar calendars. A language number may also be included in the property bag to indicate which language the month name was written in. Additionally, an index to the recognized date within the string of text may also be returned to the recognizer DLL 210. All of the information returned from the recognizer plug-in 220 to the recognizer DLL 210 may be subsequently passed to the action plug-in 225 and used in the conversion process. This is described in greater detail below with respect to FIGS. 7 and 8.

Figure 7:
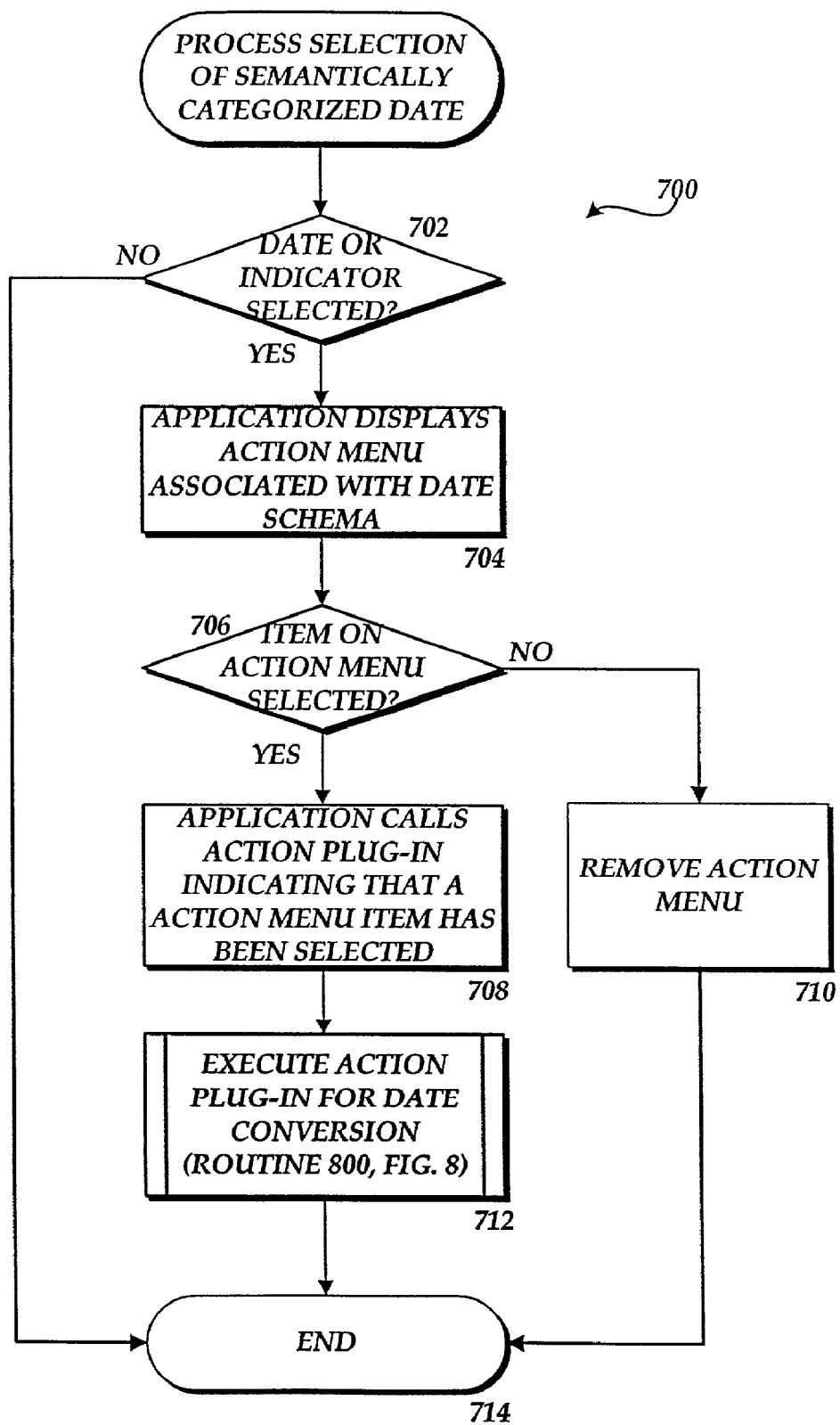
FIG. 7 is a flow diagram illustrating a routine for processing the selection of a semantically categorized date according to one actual embodiment of the present invention.

Referring now to FIG. 7, an illustrative routine 700 will be described for processing the selection of a semantically categorized date. As discussed above, once a date has been recognized within a string of text by the recognizer plug-in 220A, the date may be highlighted or an indication may be provided to the user indicating that the date has been recognized and that actions may be performed on the date. Accordingly, at block 702, a determination is made as to whether the date or indicator has been selected by a user. If the date has not been selected, the routine 700 continues to block 714, where it ends. If, however, the date or indicator has been selected, the routine 700 continues to block 704.

At block 704, the application program 205 displays the list of actions associated with the schema corresponding to the selected date. In this manner, the dropdown menu 36 described above with reference to FIG. 3A is presented to the user. The routine 700 then continues from block 704 to block 706, where a determination is made as to whether the user has selected one of the items from the list of actions. If the user has made the selection of a user interface item other than one of the items from the list of actions, the routine 700 branches to block 710, where the list of actions is removed. If, however, the user does select one of the items from the list of actions, the routine 700 continues to block 708.

At block 708, the application program 205 calls the action plug-in 225 corresponding to the appropriate schema type and indicates that an action item has been selected. The call from the application program 225 to the action plug-in 225 includes the schema name corresponding to the recognized date, the item number of the selected menu item, the name of the calling application program 205, a pointer into an object model provided by the application program 205 for accessing the document 24, the property bag described above with reference to FIG. 6, and the text of the recognized date. The routine 700 then continues to block 712, where the action plug-in for date conversion is executed. An illustrative routine for executing the action plug-in 225 for date conversion is described below with reference to FIG. 8. Once the action plug-in 225 has completed its execution, the routine 700 continues from block 712 to block 714, where it ends.

Figure 8A:
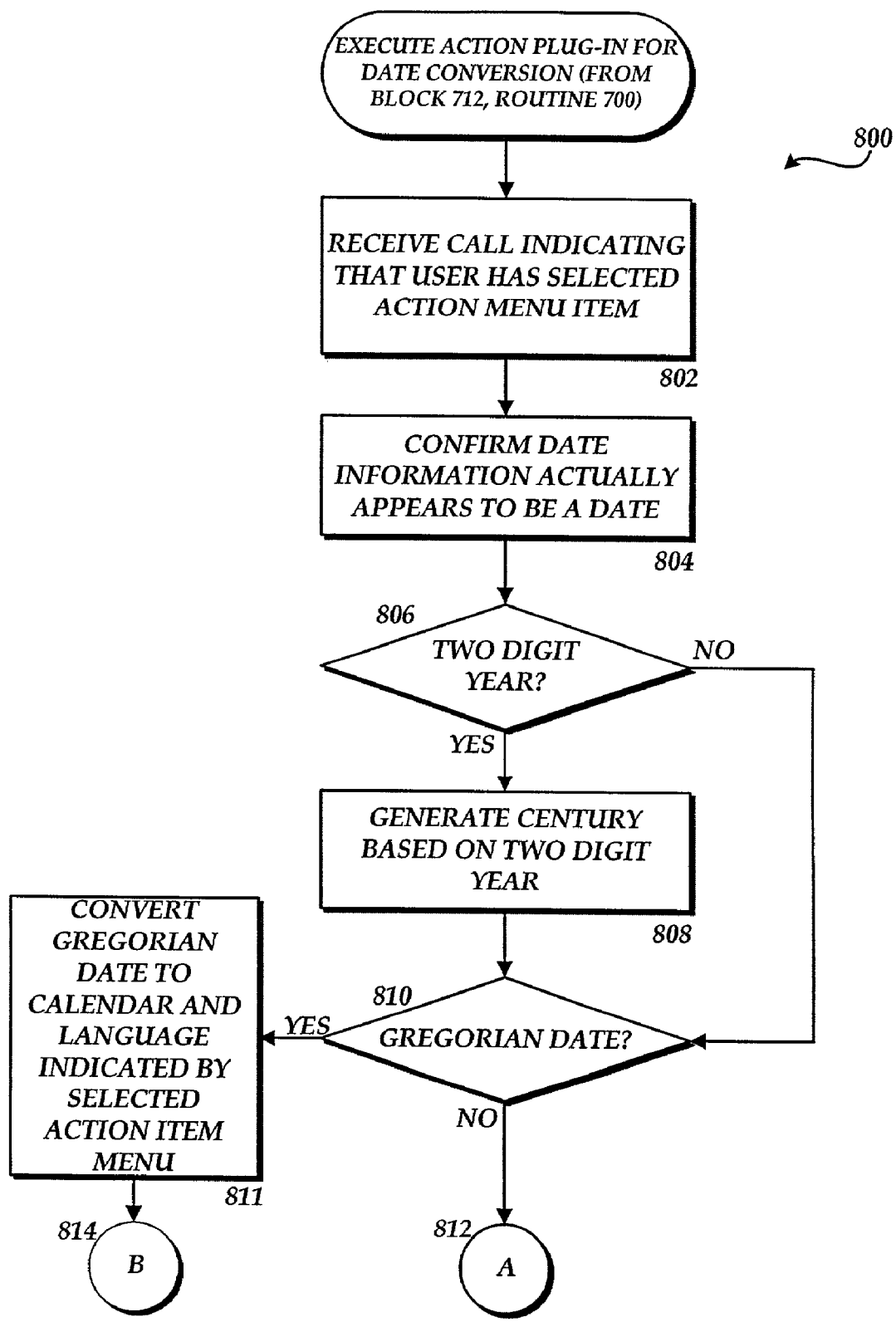
FIGS. 8A-8B are flow diagrams showing a routine for executing an action plug-in for converting dates between languages and calendars according to one actual embodiment of the present invention.
Figure 8B:
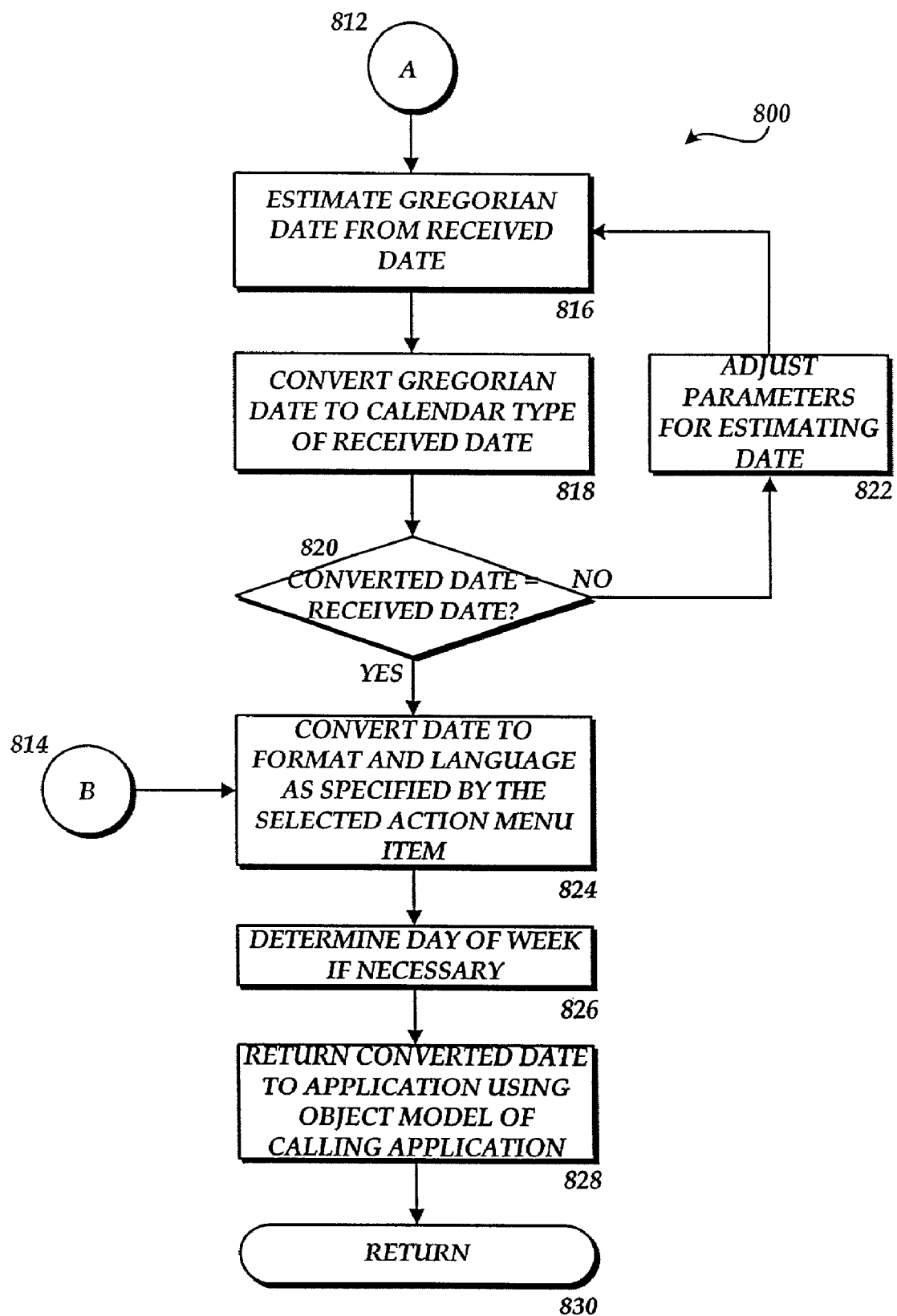

Referring now to FIG. 8, an illustrative routine 800 will be described for executing an action plug-in 225 for date conversion. The routine 800 begins at block 802, where the action plug-in 225 receives a call from the action DLL 215 indicating that the user has selected an action menu item. From block 802, the routine 800 continues to block 804, where the action plug-in 225 confirms that the date information received from the action DLL 215 actually appears to be a recognizable date. This may include determining that the received year number is a recognizable date for the calendar type. Other types of checks may also be made to confirm that the received date is valid.

From block 804, the routine 800 continues to block 806, where a determination is made as to whether the received year is represented utilizing only two digits. If the received year is represented utilizing four digits, the routine 800 branches from block 806 to block 810. If, however, the received year is expressed utilizing only two digits, the routine 800 continues to block 808. At block 808, the century corresponding to the digit year is generated. This may include making an assumption regarding the century digits based on the value of the year digits. For instance, if the year digits are "99", it may be assumed that the century digits are "19". Other types of assumptions may also be made to generate the century digits corresponding to the year digits.

From block 808, the routine 800 continues to block 810, where a determination is made as to whether the date is being represented in the Gregorian calendar. If the date is being represented in the Gregorian calendar, the routine 800 continues to block 814, where the Gregorian date is converted by the action plug-in 225 to the calendar and language types indicated by the selected action item menu. Accordingly to one embodiment of the invention, the action plug-in 225 is configured for use within an environment provided by the MICROSOFT OFFICE ("MSO") productivity suite provided by MICROSOFT Corporation of Redmond, Wash. According to this embodiment of the invention, the conversion that occurs at block 811 is performed by calling the routine INTL-DATE, which is a part of the MSO shared program code. As known to those skilled in the art, the INTLDATE routine can convert between calendars and languages. From block 811, the routine 800 then continues to block 824, discussed below. If, at block 810, it is determined that the recognized date is not expressed in a Gregorian calendar, the routine 800 continues to block 816.

At block 816, a Gregorian date is estimated from the received date. The routine then continues to block 818, where the estimated Gregorian date is converted to a date in the calendar type of the received date. For instance, if the received date is expressed in the Hijri calendar, the estimated Gregorian date is then converted to its equivalent in the Hijri calendar. This conversion may also be performed by calling the MSO shared code described above.

From block 818, the routine 800 continues to block 820, where a determination is made as to whether the converted date is equal to the received date. If the converted date is equivalent to the received date, this means that the estimated Gregorian date is the actual equivalent of the received date. Therefore, if the converted date does not equal the received date, the routine 800 branches to block 822, where parameters are adjusted for estimating the Gregorian date from the received date. The routine then continues from block 822 to block 816, where the Gregorian date is again estimated and the above procedure repeated.

If, however, at block 820 it is determined that the converted date is equal to the received date, then the routine 800 continues to block 824. At block 824, the converted Gregorian date is converted to the format and language specified by the selected action menu item. This conversion is performed by a call to the INTLDATE function in the MSO shared code.

From block 824, the routine 800 then continues to block 826 where the day of the week is determined if necessary to expressing the converted day in a particular format. For instance, if the received date only includes the date and year number, the day of week, such as "Wednesday", may be identified. The routine 800 then continues to block 828, where the date in the string of text is replaced with the converted date. According to one embodiment of the present invention, the replacement is made by accessing a document object model provided by the application program 205. Through the document object model, the action plug-in 225 can directly access the document 24 and make changes therein. Details regarding the use of such a document object model are well known to those skilled in the art. From block 828, the routine 800 continues to block 830, where it returns to block 714, described above with reference to FIG. 7.

Based on the foregoing, those skilled in the art should appreciate that various embodiments of the present invention provide a method, system, apparatus, and computer-readable medium for converting dates between calendars and languages based upon semantically labeled strings. The above specification, examples and data provide a complete description of the manufacture and use of the composition of the invention. Since many embodiments of the invention can be made without departing from the spirit and scope of the invention, the invention resides in the claims hereinafter appended.

We claim:

1. In a system for creating and editing an electronic document, a method for converting a date between calendars and human languages, the method comprising:

registering at least one date conversion component with the system;

receiving a list of actions capable of being performed by the at least one date conversion component;

determining whether a string of text contained within the electronic document contains a date;

in response to determining that the string of text includes a date, semantically labeling the date within the electronic document with schema information identifying a calendar and a human language used to express the date wherein identifying comprises associating the string of text with an inline eXtensible Markup Language (XML) tag belonging to at least one semantic category that indicates that the date is convertible and that the semantic categories are stored in the electronic document, and the schema information including a format indices indicating a format the date is written in, a calendar type indices indicating the calendar the date is written in, a language indices identifying the human language the date is written in, and properties identifying a year, a month number, and a day-of-month for the date, wherein the semantic label further includes the list of actions capable of being performed by the at least one date conversion component on the string of text determined as including a date;

providing an indication that the date is semantically labeled;

identifying a plurality of enabled human languages;

generating a plurality of menu item corresponding to the list of actions for each of the plurality of enabled languages;

determining a current user interface language setting;

providing the list of actions as a plurality of menu items corresponding to the list of actions for the current user interface language setting that may be performed on the date for converting the date in the semantically labeled string of text to another calendar, the list of actions identified based upon the schema information, wherein the application is operative to permit the editing of the electronic document in at least one of the plurality of enabled human languages, and wherein determining whether a string of text contained within the electronic document contains a date comprises determining whether a string of text contained within the electronic document contains a date expressed in one of the enabled human languages;

receiving a selection of an action from the list of actions; and generating a converted date by converting the date to the other calendar identified by the selected action, wherein generating the converted date comprises:

sending the schema information and the date to the at least one date conversion component, and receiving the converted date from the at least one date conversion component.

2. The method of claim 1, further comprising:
replacing the date in the string of text with the converted date.

3. The method of claim 2, wherein replacing the date in the string of text with the converted date comprises utilizing a document object model provided by an application for editing the electronic document to replace the date with the converted date.

4. The method of claim 3, wherein the date may be expressed in one of a plurality of calendars, human languages, and date formats.

5. The method of claim 3, wherein the list of actions comprises a dropdown menu having the plurality of menu items corresponding to the list of actions that may be performed on the date to convert the date to another calendar.

6. The method of claim 5, further comprising displaying the string of text and an indication that the date has been semantically labeled, and wherein the list of actions is provided in response to the selection of the date or the indication.

7. The method of claim 1, further comprising: converting the date to another human language.

8. The method of claim 7, further comprising:
generating a converted date by converting the date to the other calendar and the other human language identified by a selected action; and
replacing the date in the string of text with the converted date and human language.

9. The method of claim 1, wherein determining that the string of text includes the date includes providing a location and a length of a portion of the string comprising the date.

10. In a system for creating and editing an electronic document, a computer-readable medium with instructions stored thereon for converting a date between calendars and human languages, the instructions comprising:
registering at least one date conversion component with the system;
receiving a list of actions capable of being performed by the at least one date conversion component;
receiving a portion of the electronic document as a string of text;
analyzing the string of text to determine whether the string of text includes a date;
in response to determining that the string of text includes a date, semantically labeling the date with schema information identifying a calendar and a human language used to express the date wherein identifying comprises associating the string of text with an inline eXtensible Markup Language (XML) tag belonging to at least one semantic category that indicates that the date is convertible and that the semantic categories are stored in the electronic document, and the schema information including a format indices indicating a format the date is written in, a calendar type indices indicating the calendar the date is written in, a language indices identifying the human language the date is written in, and properties identifying a year, a month number, and a day-of-month for the date, wherein the semantic label further includes the list of actions capable of being performed by the at least one date conversion component for converting the date to another human language and another calendar to be performed on the string of text determined as including a date;
displaying the string of text and an indication that the date has been semantically labeled;
identifying a plurality of enabled human languages;
generating a plurality of menu items corresponding to the list of actions for each of the plurality of enabled languages;
determining a current user interface language setting;
providing the list of actions as a plurality of menu items corresponding to the list of actions for the current user interface language setting that may be performed on the date to convert the date in the semantically labeled string of text to another human language and calendar based on the semantic label;
receiving the selection of an action from the list of actions;
in response to receiving the selection of an action, generating a converted date by converting the date to the other calendar and human language identified by the selected action, wherein generating the converted date comprises:
sending the schema information and the date to the at least one date conversion component, and
receiving the converted date from the at least one date conversion component; and
replacing the date with the date converted to the other human language and calendar in the string of text.

11. The computer-readable medium of claim 10, wherein displaying the list of actions comprises displaying a dropdown menu having at least one of the menu items corresponding to the list of actions that may be performed on the date to convert the date to another calendar.

12. A system for converting a date between calendars and human languages, the system comprising:
a recognizer plug-in capable of:
identifying a plurality of enabled human languages,
receiving a portion of an electronic document as a string of text from an application program,
analyzing the string of text to determine whether the string of text includes a date,
in response to determining that the string of text includes a date, semantically labeling the date within the electronic document with schema information identifying a calendar and a human language used to express the date wherein identifying comprises associating the string of text with an inline eXtensible Markup Language (XML) tag belonging to at least one semantic category that indicates that the date is convertible and that the semantic categories are stored in the electronic document, and wherein the semantic label further includes a list of actions to be performed for converting the date to another human language and calendar, wherein the list of actions comprises a dropdown menu having a plurality of menu items corresponding to the list of actions that may be performed on the date to convert the date to another calendar and human language,
generating the plurality of menu items corresponding to the list of actions for each of the plurality of enabled languages,
determining a current user interface language setting for an application program associated with the electronic document to determine the human language used to express the date, the schema information including a format indices indicating a format the date is written in, a calendar type indices indicating the calendar the date is written in, a language indices identifying the human language the date is written in, and properties identifying a year, a month number, and a day-of-month for the date, and providing, to the application, the plurality of menu items corresponding to the list of actions and the current user interface language setting;

the application program for creating and editing the electronic document, the application program capable of:

displaying the string of text and an indication that the date has been semantically labeled, displaying the list of actions that may be performed on the date to convert the date in the semantically labeled string of text to another human language and calendar, receiving the selection of an action from the list of actions, and sending the selected action and the date to an action plug-in; and an action plug-in capable of:

registering the action plug-in with the application program, providing the list of actions that may be performed on the date, receiving the schema information and the date from the application program, generating a converted date by converting the date to the other calendar and human language identified by the selected action, and replacing the date with the converted date in the string of text.

13. The system of claim 12, wherein the recognizer plug-in is further configured to provide a location and a length of a portion of the string comprising the date.

* * * * *